United States Patent
Goldstein et al.

(10) Patent No.: US 10,129,107 B2
(45) Date of Patent: Nov. 13, 2018

(54) INTERACTIVE SHARING OF SHARABLE ITEM

(71) Applicant: Hipmunk, Inc., San Francisco, CA (US)

(72) Inventors: Adam Julian Goldstein, San Francisco, CA (US); Kevin Malone, San Francisco, CA (US); Steven Ji, San Francisco, CA (US); Navin Lal, San Francisco, CA (US); Christopher Brian Slowe, San Francisco, CA (US); Steven Ladd Huffman, San Francisco, CA (US); William Glass, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 294 days.

(21) Appl. No.: 14/942,161

(22) Filed: Nov. 16, 2015

(65) Prior Publication Data

US 2017/0141972 A1    May 18, 2017

(51) Int. Cl.
*H04L 12/24*    (2006.01)

(52) U.S. Cl.
CPC .......... *H04L 41/5054* (2013.01); *H04L 41/22* (2013.01); *H04L 41/5051* (2013.01)

(58) Field of Classification Search
None
See application file for complete search history.

(56) References Cited

U.S. PATENT DOCUMENTS

| | | | |
|---|---|---|---|
| 5,983,205 A | * | 11/1999 | Brams .................... G06Q 99/00 705/1.1 |
| 6,457,008 B1 | | 9/2002 | Rhee et al. |

(Continued)

FOREIGN PATENT DOCUMENTS

| | | |
|---|---|---|
| WO | 2017087126 | 5/2017 |
| WO | 2017087127 | 5/2017 |

OTHER PUBLICATIONS

"International Application Serial No. PCT/US2016/058704, Response filed Aug. 8, 2017 to Written Opinion dated Jan. 19, 2017", 6 pgs.

(Continued)

*Primary Examiner* — Thomas J Dailey
(74) *Attorney, Agent, or Firm* — Schwegman Lundberg & Woessner, P.A.

(57) ABSTRACT

An item sharing machine is configured to receive share requests submitted by requesters and specifying numerical values accorded to the shareable item by the requesters. The item sharing machine determines a distribution of the numerical values and generates an allocation plan based on the distribution of the numerical values, which include a first numerical value accorded by a first requester. The item sharing machine determines an allocated percentage at which the shareable item is allocated to the first requester and selects an alternative percentage at which the shareable item is allocable to the first requester. The item sharing machine calculates an alternative numerical value accordable to the shareable item and causes presentation of a notification that the shareable item is allocable to the first requester at the alternative percentage, conditioned upon a future share request indicating that the alternative numerical value is accorded to the shareable item.

20 Claims, 17 Drawing Sheets

(56) References Cited

U.S. PATENT DOCUMENTS

| | | | | |
|---|---|---|---|---|
| 7,689,458 | B2* | 3/2010 | Heckerman | G06Q 30/02 705/14.46 |
| 7,905,777 | B2* | 3/2011 | Muir | G07F 17/3255 463/25 |
| 8,190,489 | B2* | 5/2012 | Sandholm | G06Q 30/0222 705/26.3 |
| 8,874,456 | B2* | 10/2014 | Lakritz | G06Q 10/06 705/7.12 |
| 9,479,451 | B1* | 10/2016 | Wertheimer | H04L 47/748 |
| 9,634,958 | B2* | 4/2017 | Ennaji | H04L 47/828 |
| 9,645,840 | B2* | 5/2017 | Ennaji | G06F 9/45533 |
| 9,842,312 | B1* | 12/2017 | Rosati | G06Q 10/103 |
| 9,965,149 | B2 | 5/2018 | Goldstein et al. | |
| 2004/0024686 | A1* | 2/2004 | Sandholm | G06Q 30/08 705/37 |
| 2004/0109030 | A1 | 6/2004 | Farrington et al. | |
| 2008/0052154 | A1 | 2/2008 | Gulliksen | |
| 2008/0126547 | A1* | 5/2008 | Waldspurger | G06F 9/4881 709/226 |
| 2009/0265205 | A1 | 10/2009 | Stinchcombe et al. | |
| 2010/0306161 | A1 | 12/2010 | Chen et al. | |
| 2013/0132130 | A1 | 5/2013 | Fox et al. | |
| 2014/0136342 | A1 | 5/2014 | Ringdahl | |
| 2014/0278988 | A1 | 9/2014 | Moissinac et al. | |
| 2015/0046279 | A1* | 2/2015 | Wang | G06F 9/5027 705/26.3 |
| 2015/0302486 | A1 | 10/2015 | Foufas et al. | |
| 2017/0139549 | A1 | 5/2017 | Goldstein et al. | |

OTHER PUBLICATIONS

"International Application Serial No. PCT/US2016/058704, International Search Report dated Jan. 19, 2017", 4 pgs.

"International Application Serial No. PCT/US2016/058704, International Written Opinion dated Jan. 19, 2017", 8 pgs.

"International Application Serial No. PCT/US2016/058700, International Search Report dated Feb. 15, 2017", 2 pgs.

"International Application Serial No. PCT/US2016/058700, Written Opinion dated Feb. 15, 2017", 7 pgs.

"International Application Serial No. PCT/US2016/058704, International Preliminary Report on Patentability dated Feb. 15, 2018", 11 pgs.

"U.S. Appl. No. 14/942,143, Non Final Office Action dated Sep. 12, 2017", 9 pgs.

"U.S. Appl. No. 14/942,143, Response filed Dec. 1, 2017 to Non Final Office Action dated Sep. 12, 2017", 13 pgs.

"International Application Serial No. PCT US2016 058700, Response filed Jun. 28, 2017 to Written Opinion dated Feb. 15, 2017", 5 pgs.

"U.S. Appl. No. 14/942,143, Notice of Allowance dated Jan. 8, 2018", 5 pgs.

"International Application Serial No. PCT US2016 058700, International Preliminary Report on Patentability dated Feb. 14, 2018", 5 pgs.

* cited by examiner

INTERACTIVE SHARING OF SHARABLE ITEM

TECHNICAL FIELD

The subject matter disclosed herein generally relates to the technical field of special-purpose machines that facilitate allocation of items, provision of graphical user interfaces (GUIs), or both, including computerized variants of such special-purpose machines and improvements to such variants, and to the technologies by which such special-purpose machines become improved compared to other special-purpose machines that facilitate allocation of items, provision of GUIs, or both. Specifically, the present disclosure addresses systems and methods that facilitate interactive sharing of shareable items, for example, by linking an allocable region of a GUI.

BACKGROUND

A machine may be configured to interact with one or more users by generating or otherwise providing a GUI. For example, a server machine may generate a GUI, provide the generated GUI to a client machine (e.g., a user device) and, via one or more networks, cause a client machine to present (e.g., display) the GUI. One or more interactive regions (e.g., windows, buttons, images, or other selectable areas) of the GUI may be linked (e.g., hyperlinked) to information available from the server machine or available from a different server machine (e.g., a third-party server machine). Typically, a human GUI designer (e.g., webpage designer) decides to which server machine an interactive region will be linked, and a human GUI designer may design or redesign the GUI accordingly. However, such a process may be slow, expensive, or otherwise inefficient.

BRIEF DESCRIPTION OF THE DRAWINGS

Some embodiments are illustrated by way of example and not limitation in the figures of the accompanying drawings.

DETAILED DESCRIPTION

Figure 1:
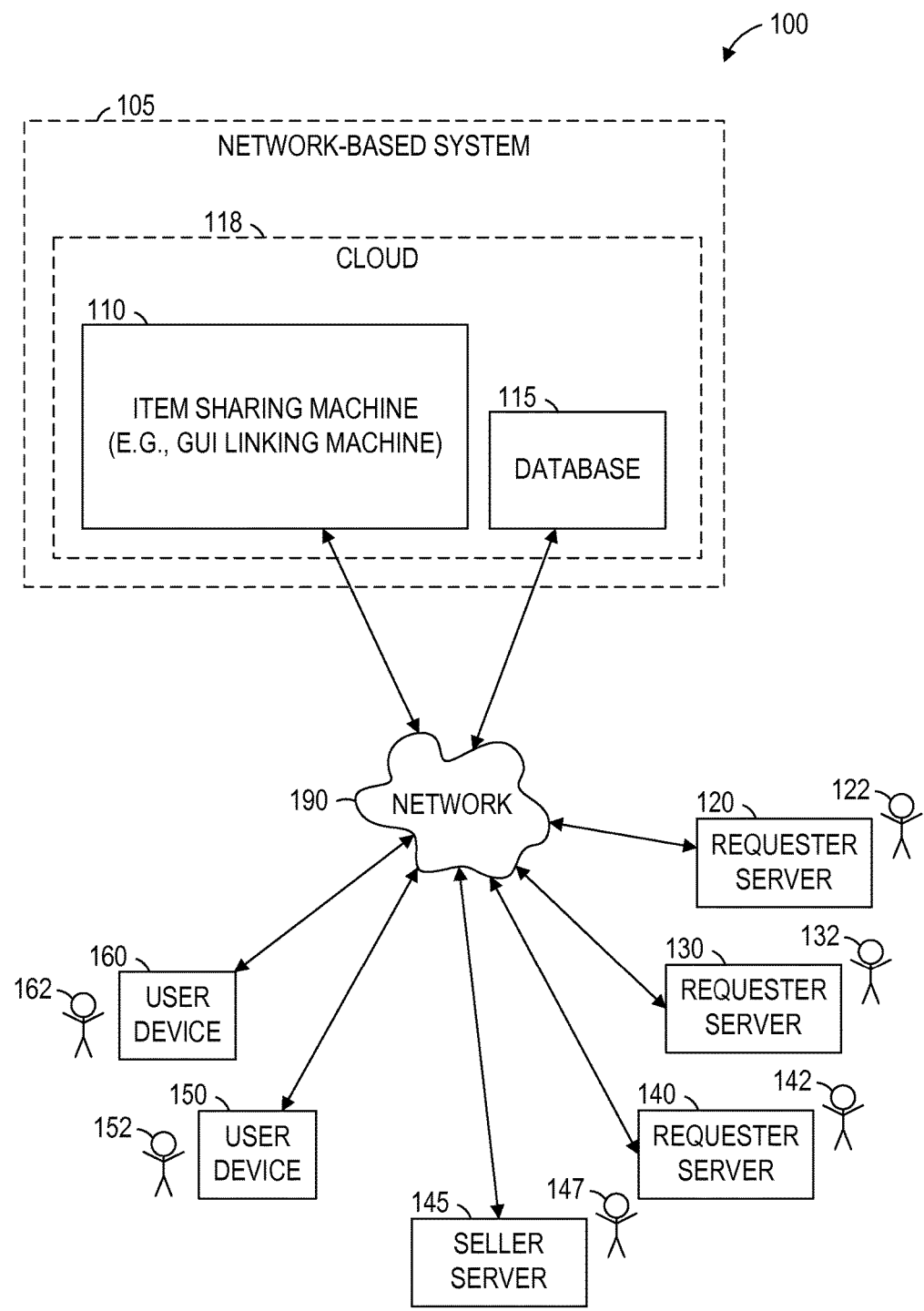
FIG. 1 is a network diagram illustrating a network environment suitable for facilitating the sharing of a shareable item (e g, linking an allocable region of a GUI), according to some example embodiments.

Example methods (e.g., algorithms) facilitate interactive sharing of a shareable item, and example systems (e.g., special-purpose machines) are configured to facilitate interactive sharing of a shareable item. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In various situations, an item is shareable in the sense that the item itself, use thereof, or a benefit thereof can be shared by multiple requesters. One approach is to allocate different portions of the item, its use, or its benefit to different requesters simultaneously or otherwise contemporaneously. For example, a cake can be cut into slices, and each slice can be served to a different diner seated around a dinner table (e.g., at the same time). Another approach is to repeatedly allocate (e.g., re-allocate) the entire item, its entire use, or its entire benefit to different requesters at different times. For example, a sports car can be rented to different renters on different days. However, if one requester obtains an increase in his proportional allocation of the item, its use, or its benefit, then the other requesters typically receive correspondingly decreased proportional allocations of the item, its use, or its benefit. Considering the sports car example, it is possible for one frequent renter to rent the car so often (e.g., 28 days per month) that the other renters' experiences approach being effectively denied the car, and the frequent renter's own experience approaches ownership of the car.

The example methods and systems described herein are discussed in an example context in which the shareable item is an allocable region of a GUI. For example, the allocable region of the GUI may be an available window or other available region (e.g., a button or a particular position within a pulldown menu) of a webpage or other web interface, where allocation of the region includes linking the region to a particular requester's server (e.g., such that the requester's server will receive the next clickthrough when a user clicks on the region), or where allocation of the region includes retrieval and incorporation of some content from the particular requester's server (e.g., such that the requester's server will receive a page view request when the region is next rendered to a user's browser). However, the example methods and systems described herein are adaptable to other contexts, and the shareable item can be any item (e.g., a good, a service, or a license or other authorization) that a machine may provide, deliver, cause to be delivered, assign, or otherwise allocate to different requesters at different times.

A machine (e.g., a server computer or server machine) is configured by appropriate software (e.g., software modules) to function as an item sharing machine in the example form of a GUI linking machine, and the GUI linking machine is accordingly configured to receive share requests, in the example form of allocation requests (e.g., bids on the allocable region). Such share requests are submitted by requesters (e.g., service providers acting as bidders for the allocable region). The allocation requests specify various numerical values (e.g., bid values) accorded to the allocable region by the requesters. The GUI linking machine then determines a distribution (e.g., a spread) of the numerical values and, based on the distribution, generates an allocation plan (e.g., defined by configuration parameters) for the allocable region.

The GUI linking machine is configured to repeatedly (e.g., cyclically, sequentially, or both) update the allocable region of the GUI based on the allocation plan. For example, the GUI linking machine can cyclically update the allocable region by selectively linking (e.g., re-linking) the allocable region to different computers (e.g., different servers) of different requesters based on the allocation plan (e.g., based on its configuration parameters). In some cases, the allocation plan includes a weighted randomization algorithm, and this selective linking is performed according to the weighted randomization algorithm each time the GUI is provided (e.g., rendered) to a browser. The allocable region of the GUI accordingly becomes linked to computers (e.g., servers) of different requesters at different times, and the GUI linking machine is configured to cause one or more user devices to present the GUI with the allocable region linked to such computers at different times.

The item sharing machine may also be configured by appropriate software (e.g., software module) to recommend alternative numerical values to one or more of the requesters. As noted above, the item sharing machine may receive share requests (e.g., bids on the shareable item) submitted by requesters. The share requests specifying numerical values (e.g., bid values) accorded to the shareable item by the requesters (e.g., bidders for the shareable item). The item sharing machine determines a distribution (e.g., a spread) of the numerical values and generates configuration parameters that define an allocation plan (e.g., including a weighted randomization algorithm) for the shareable item based on the distribution of the numerical values, which may include a first numerical value accorded to the shareable item by a first requester among the requesters.

The item sharing machine then determines an allocated percentage at which the shareable item is allocated to the first requester, in accordance with the configuration parameters of the allocation plan (e.g., including its weighted randomization algorithm). The item sharing machine then selects an alternative percentage at which the shareable item is allocable to the first requester (e.g., an alternative percentage at which the shareable item could be allocated to the first requester, but currently is not allocated to the first requester). The item sharing machine then calculates an alternative numerical value (e.g., an alternative bid) accordable to the shareable item by the first requester and causes a computer (e.g., first server) of the first requester to present a notification that the shareable item is allocable to the first requester at the alternative percentage, conditioned upon reception of a future share request that indicates that the first requester accords the alternative numerical value to the shareable item (e.g., a message such as "If you increase your offer to $2.50 per click, you can get 85% of the clicks from this button, assuming all other bidders keep their bids constant."). Further details of the item sharing machine are described below.

FIG. 1 is a network diagram illustrating a network environment 100 suitable for facilitating the sharing of a shareable item (e.g., cyclically or otherwise repeatedly linking an allocable region of a GUI), according to some example embodiments. The network environment 100 includes an item sharing machine 110 (e.g., a GUI linking machine), a database 115, requester servers 120, 130, and 140, a seller server 145, and user devices 150 and 160, all communicatively coupled to each other via a network 190. The item sharing machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the user devices 150 and 160). The item sharing machine 110, the requester servers 120, 130, and 140, the seller server 145, and the user devices 150 and 160 may each be implemented in a special-purpose (e.g., specialized) computer system, in whole or in part, as described below with respect to FIG. 17.

Also shown in FIG. 1 are requesters 122, 132, and 142, a seller 147, and users 152 and 162, each of which may be a human user (e.g., a human being), a machine user (e.g., a computer configured by a software program to interact with the requester server 120, 130, or 140, the seller server 145, or the user device 150 or 160, respectively), or any suitable combination thereof (e.g., a human assisted by a machine or a machine supervised by a human). The requester 122 is associated with the requester server 120 and may be a user (e.g., administrative user) of the requester server 120. For example, the requester server 120 may be a desktop computer, a vehicle computer, a tablet computer, a navigational device, a portable media device, a smart phone, or a wearable device (e.g., a smart watch, smart glasses, smart clothing, or smart jewelry) belonging to the requester 122.

The requester 132 is associated with the requester server 130 and may be a user of the requester server 130. For example, the requester server 130 may be a desktop computer, a vehicle computer, a tablet computer, a navigational device, a portable media device, a smart phone, or a wearable device belonging to the requester 132. The requester 142 is associated with the requester server 140 and may be a user of the requester server 140. Accordingly, the requester server 140 may be a desktop computer, a vehicle computer, a tablet computer, a navigational device, a portable media device, a smart phone, or a wearable device belonging to the requester 142. The seller 147 is a special requester who is associated with the seller server 145 and who may be a user (e.g., administrator or other operator) of the seller server 145, which may be a desktop computer, a vehicle computer, a tablet computer, a navigational device, a portable media device, a smart phone, or a wearable device belonging to the seller 147. Furthermore, the seller 147 may be a seller of an item (e.g., a good, a service, or a license) whose use or benefit can be arranged by the seller 147 or alternatively by any of the requesters 122, 132, and 142. For example, the seller 147 may be hotel operator that can provide accommodations (e.g., vacation packages or other hotel stays) at its hotel, and each of the requesters 122, 132, and 142 may be alternative booking providers (e.g., travel agencies) through which such accommodations at the hotel can be reserved, purchased, or both. As another example, the seller 147 may be an airline that can provide airline flights, and each of the requesters 122, 132, and 142 may be alternative booking providers through which the airline's flights can also be reserved, purchased, or both.

The user 152 is associated with the device 150 and may be a user (e.g., administrator) of the user device 150, which may be a desktop computer, a vehicle computer, a tablet computer, a navigational device, a portable media device, a smart phone, or a wearable device belonging to the user 152.

Likewise, the user 162 is associated with the user device 160 and may be a user of the user device 160, which may be a desktop computer, a vehicle computer, a tablet computer, a navigational device, a portable media device, a smart phone, or a wearable device belonging to the user 162.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 17, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the item sharing machine 110 and the user device 150, or between the item sharing machine 110 and the requester server 120). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
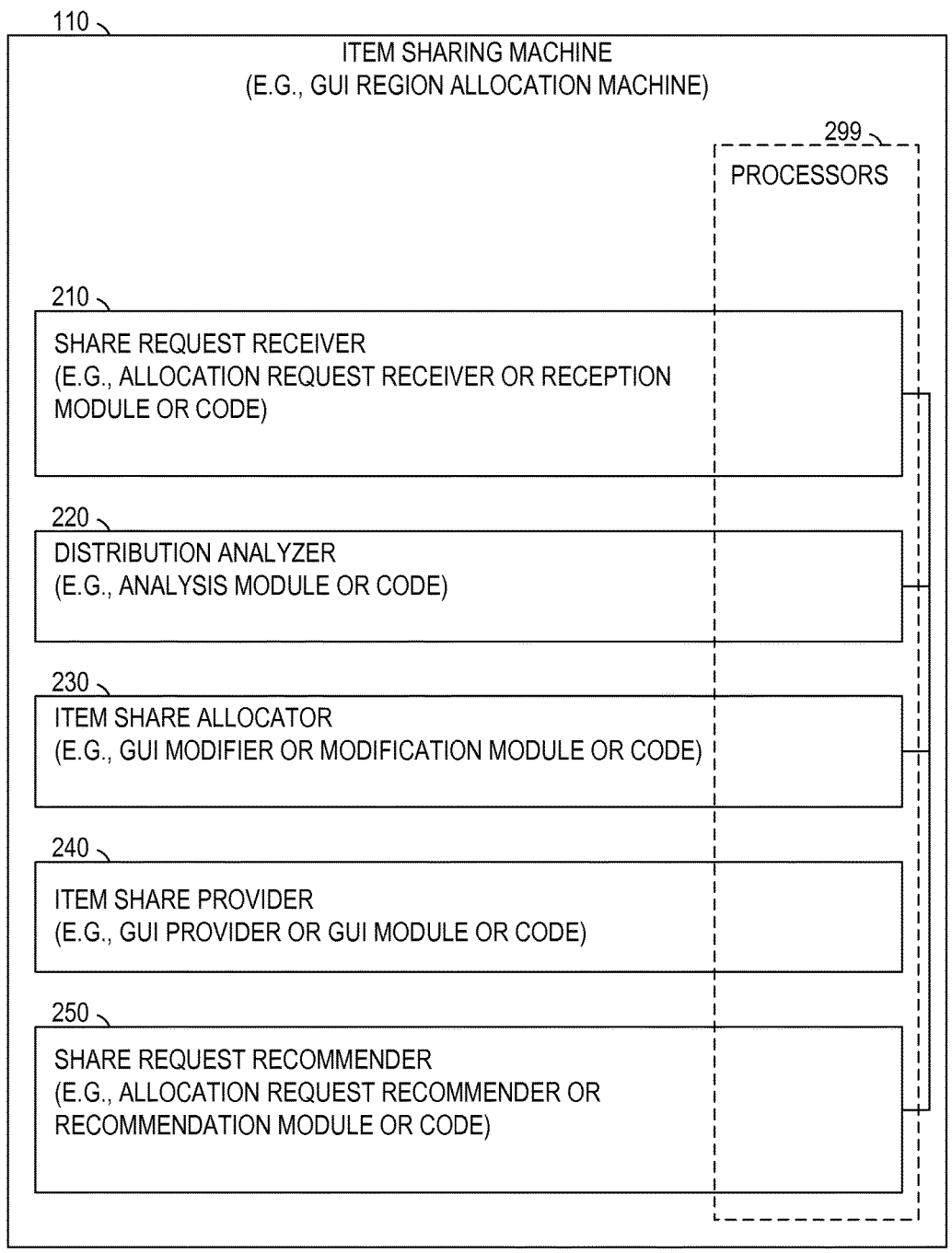
FIG. 2 is a block diagram illustrating components of an item sharing machine, according to some example embodiments.

FIG. 2 is a block diagram illustrating components of the item sharing machine 110, according to some example embodiments. The item sharing machine 110 is shown as including a share request receiver 210, a distribution analyzer 220, an item share allocator 230, an item share provider 240, and a share request recommender 250, all configured to communicate with each other (e.g., via a bus, shared memory, or a switch).

As shown in FIG. 2, the share request receiver 210 may be implemented in the example forms of an allocation request receiver, a reception module, reception code, or any suitable combination thereof. The distribution analyzer 220 may be implemented in the example forms of an analysis module, analysis code, or any suitable combination thereof. The item share allocator 230 may be implemented in the example forms of a GUI modifier, a modification module, modification code, or any suitable combination thereof. The item share provider 240 may be implemented in the example forms of a GUI provider (e.g., GUI generator), a GUI module (e.g. GUI generation module), GUI code (e.g., GUI generation code), or any suitable combination thereof. The share request recommender 250 may be implemented in the example forms of an allocation request recommender, a recommendation module, recommendation code, or any suitable combination thereof. Furthermore, one or more processors 299 (e.g., hardware processors, digital processors, or any suitable combination thereof) may be included (e.g., temporarily or permanently) in the share request receiver 210, the distribution analyzer 220, the item share allocator 230, the item share provider 240, the share request recommender 250, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
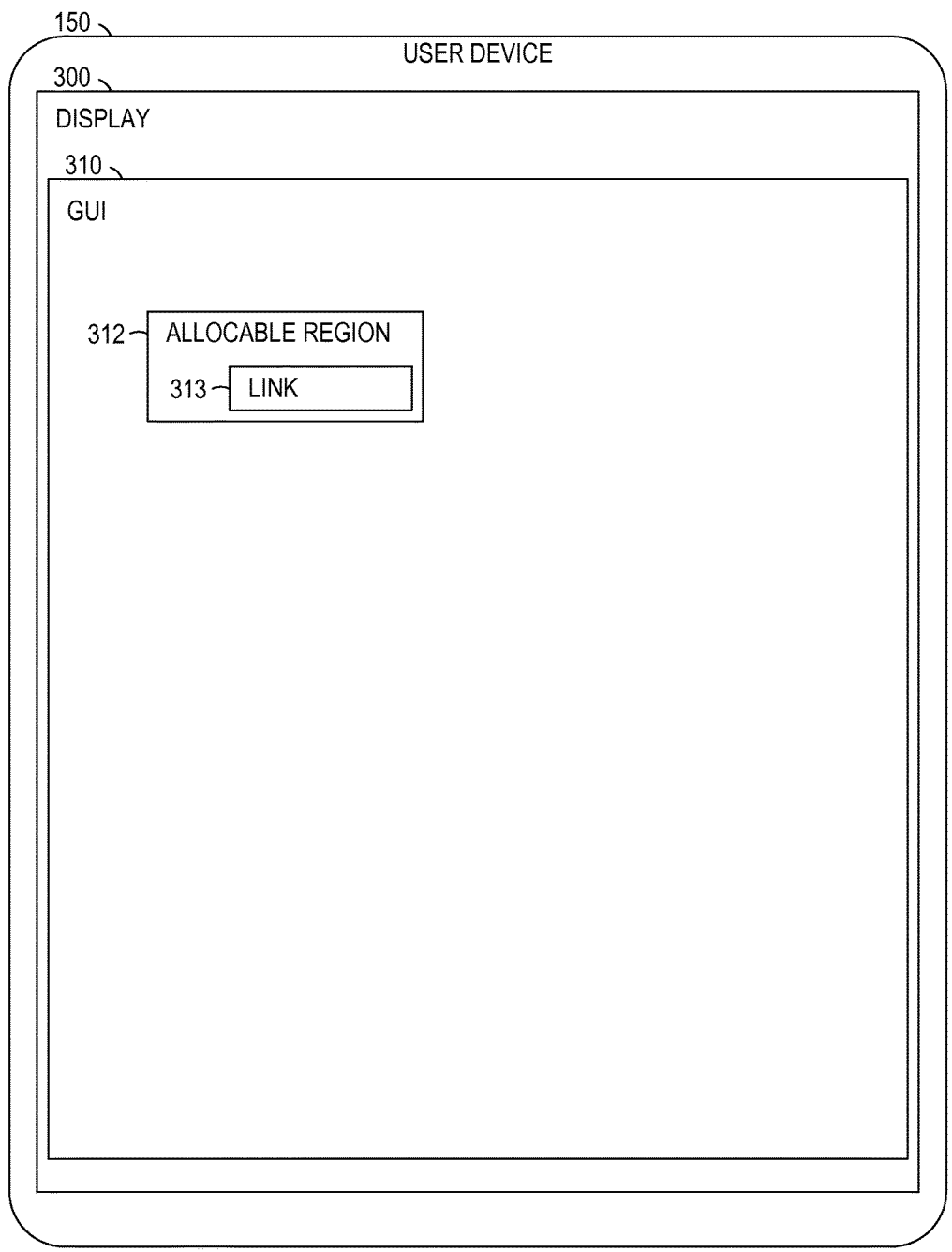
FIG. 3 is a face view of a user device with a display presenting a shareable item, in the example form of an allocable region of a GUI, according to some example embodiments.

FIG. 3 is a face view of the user device 150 with a display 300 presenting a shareable item in the example form of an allocable region 312 of a GUI 310, according to some example embodiments. The allocable region 312 is a portion of the GUI 310 and may be or include a window (e.g., widget, sub-window, frame, button, or a position within a list) or other region within the GUI 310. As shown in FIG. 3, the allocable region 312 may be linked (e.g., hyperlinked) to a server (e.g., the requester server 120, 130, or 140 or the seller server 145) by inclusion of a link 313 (e.g., a uniform resource locator (URL) or other uniform resource identifier (URI)) that references the server to which the allocable region 312 is linked. The link 313 is repeatedly updated (e.g., modified, revised, or edited) by the item sharing machine 110, such that the link 313 repeatedly references different servers at different times, which accordingly causes the allocable region 312 to be repeatedly allocated to different servers at different times.

Figure 4:
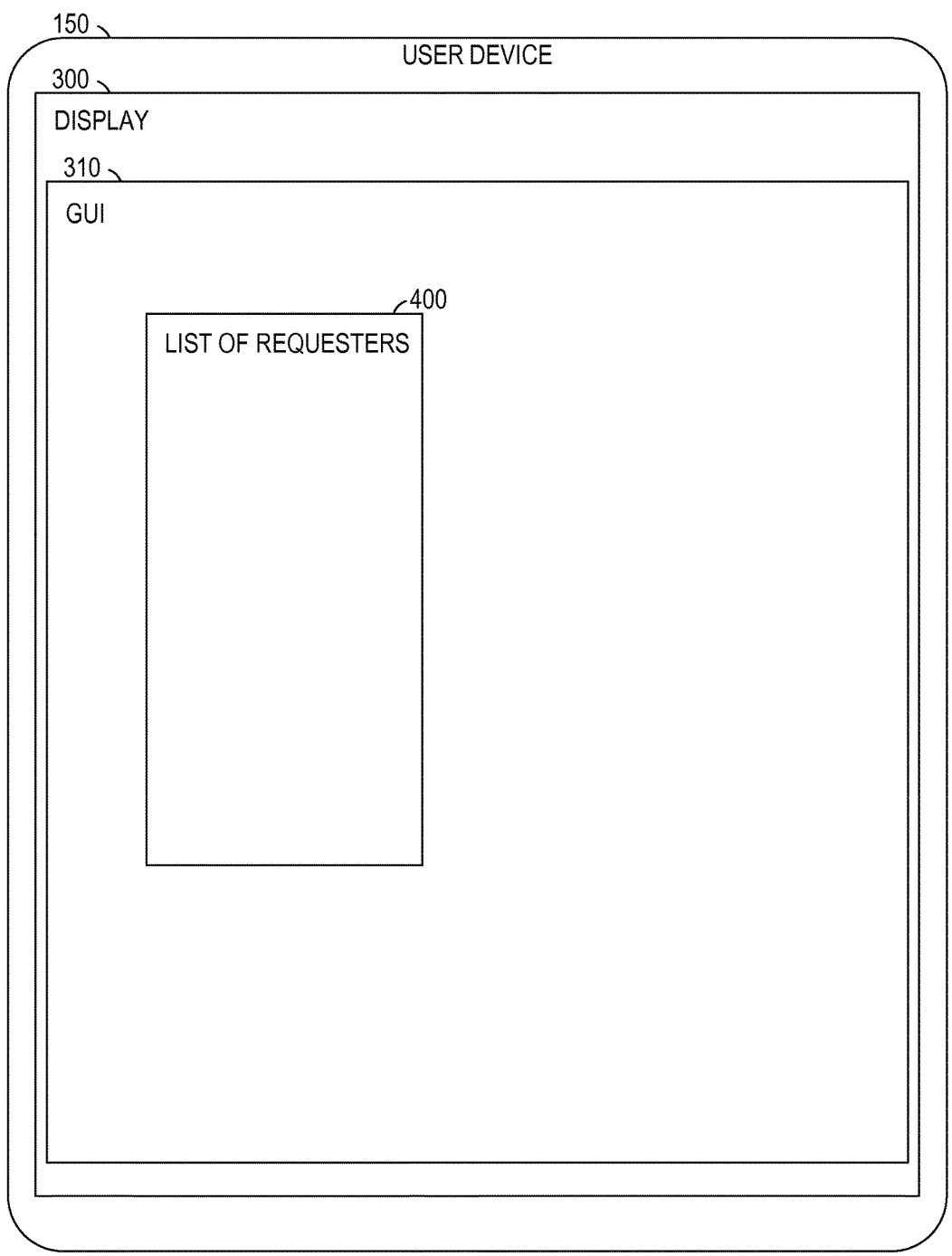
FIGS. 4-5 are face views of the user device with the display presenting shareable items, in the example forms of allocable positions within a list in the GUI, according to some example embodiments.
Figure 5:
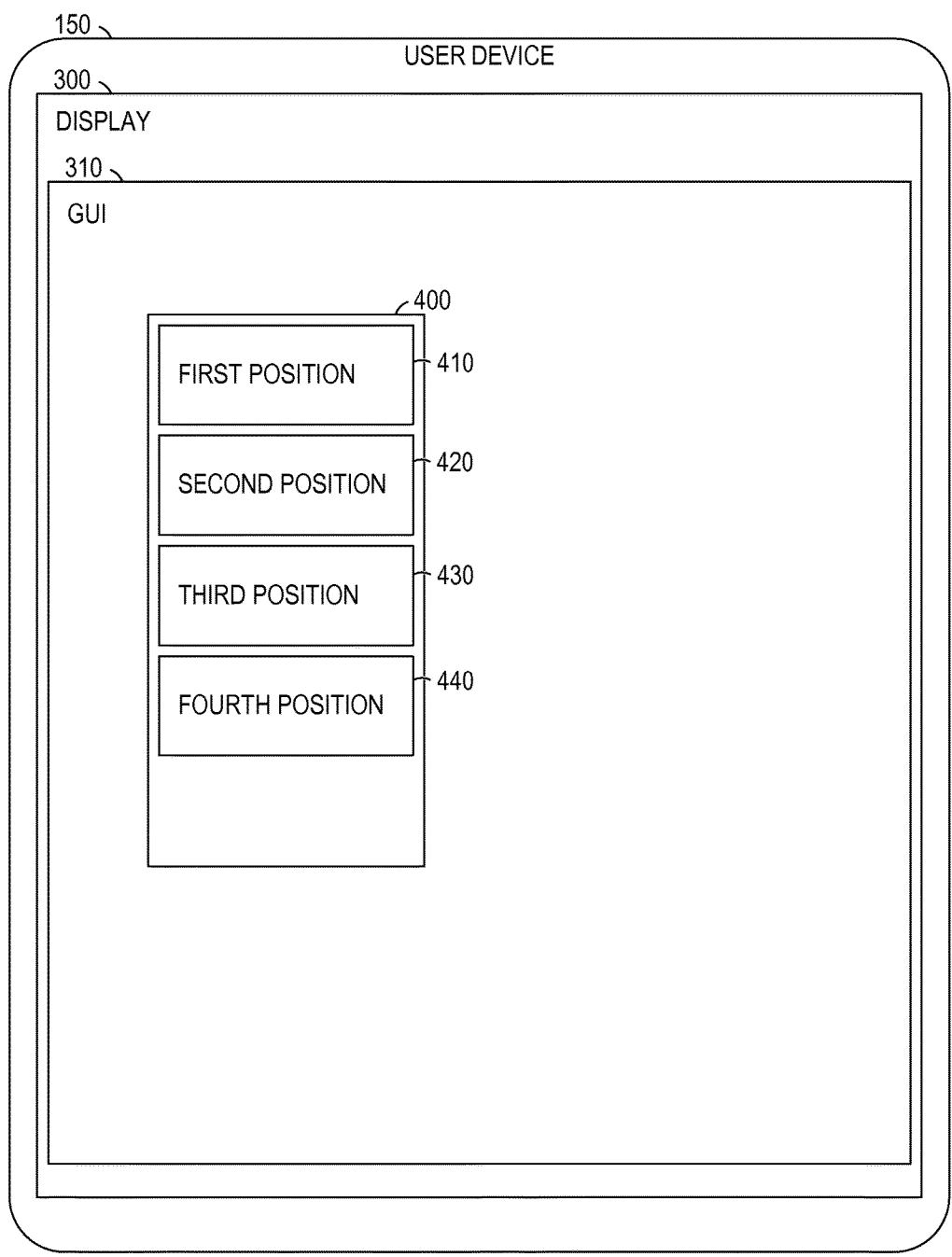

FIGS. 4-5 are face views of the user device 150 with the display 300 presenting shareable items in the example forms of allocable positions within a list in the GUI 310, according to some example embodiments. As shown in FIG. 4, the GUI 310 includes a list 400 of requesters (e.g., including one or more of the requesters 122, 132, and 142). As shown in FIG. 5, the list 400 of requesters includes multiple positions 410, 420, 430, and 440. In some example embodiments, the multiple positions 410, 420, 430, and 440 are visibly bounded (e.g., with borders or demarked by a change in pixel color). For clarity, the position 410 may be considered as a first position 410; the position 420 may be considered as a second position 420; the position 430 may be considered as a third position; and the position 440 may be considered as a fourth position.

In certain example embodiments, the first position 410 is statistically known to garner the most impressions (e.g., clickthroughs, page views, or both) from users (e.g., users 152 and 162), the most valuable impressions (e.g., where clicks on that position are more likely to result in purchases), the least valuable impressions (e.g., where clicks on the position are less likely to result in purchases), or any suitable combination thereof. In some cases, impressions garnered by the positions 420-440 generally decrease from the second position 420, to the third position 430, to the fourth position 440; while in other cases, impressions are relatively constant across all positions except the first position 410. In certain cases, clicks garnered by the positions 420-440 generally have less value from the second position 420, to the third position 430, to the fourth position 440; while in other cases, clicks garnered by the positions 420-440 generally have more value from the second position 420, to the third position 430, to the fourth position 440; while in still other cases, values relatively constant across all positions except the first position 410. In all cases, however, each position 410-440 in the list 400 of requesters is an allocable region (e.g., similar to the allocable region 312) of the GUI 310, and each position 410-400 can be linked to different servers at different times (e.g., by inclusion of a link similar to the link 313). In this sense, each position 410-400 is a separate shareable item.

Figure 6:
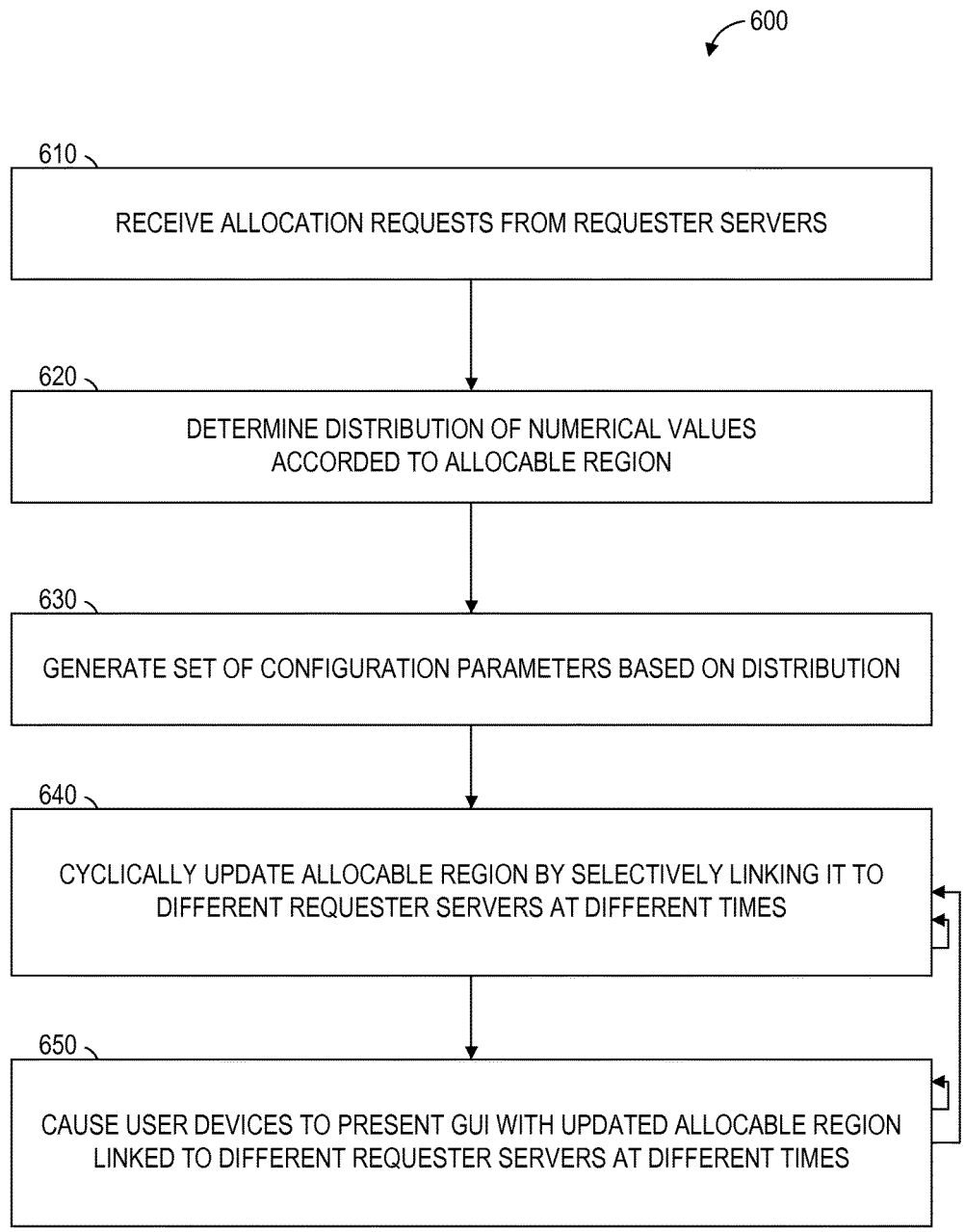
FIGS. 6-12 are flowcharts illustrating operations of the item sharing machine in performing a method of linking an allocable region of the GUI, according to some example embodiments.

FIGS. 6-12 are flowcharts illustrating operations of the item sharing machine 110 in performing a method 600 of linking the allocable region 312 of the GUI 310, according to some example embodiments. The method 600 is similarly applicable to linking any allocable region (e.g., one of the positions 410-440) of the GUI 310. Operations in the method 600 may be performed by the item sharing machine 110, using components (e.g., modules) described above with respect to FIG. 2, using one or more processors (e.g., microprocessors or other hardware processors), or using any suitable combination thereof. As shown in FIG. 6, the method 600 includes operations 610, 620, 630, 640, and 650.

In operation 610, the share request receiver 210 receives allocation requests (e.g., submissions of bids) each communicated from a different one of the requester servers 120, 130, and 140. In some example embodiments, an additional allocation request is also received by the share request receiver 210 from the seller server 145. As noted above, the allocation requests are submitted by requesters (e.g., requesters 122, 132, and 142) for the allocable region 312. The allocation requests specify numerical values (e.g., bid prices) that have been accorded to the allocable region 312 by the requesters (e.g., requesters 122, 132, and 142).

In operation 620, the distribution analyzer 220 determines a distribution (e.g., spread) of the numerical values accorded to the allocable region 312. The determination of the distribution may include performance of one or more statistical calculations (e.g., calculating a maximum, a minimum, one or more relative maxima, one or more relative minima, an average, a median, a standard deviation, or any suitable combination thereof).

In operation 630, the item share allocator 330 generates a set of configuration parameters that defines an allocation plan for the allocable region 312. This may have the effect of creating or otherwise defining the allocation plan. The generation of the configuration parameters is based on the distribution of the numerical values, as determined in operation 620. According to various example embodiments, the set of configuration parameters defines allocable shares of impressions that are apportioned to the requesters (e.g., requesters 122, 132, and 142). As examples, the allocable shares of impressions may include allocable shares of clickthroughs, allocable shares of page views, or any suitable combination thereof.

In operation 640, the item share provider 240 repeatedly (e.g., cyclically) updates the allocable region 312 of the GUI 310 based on the allocation plan created or otherwise defined in operation 630. This may include selectively linking the allocable region 312 (e.g., by updating the link 313) to each of the requester servers 120, 130, and 140 at different times, in accordance with the allocation plan. In some example embodiments, the selective linking of the allocable region 312 also includes linking the allocable region 312 to the seller server 145 at certain times, based on the allocation plan. Additional details of operation 640 are discussed below. As shown in FIG. 6, operation 640 can be repeatedly performed.

In operation 650, the item share provider 240 causes one or more of the user devices 150 and 160 to present the GUI 310, with the allocable region 312 linked according to the cyclic updating performed in operation 640. As shown in FIG. 6, operation 650 can be repeatedly performed, and the combination of operations 640 and 650 can be repeatedly performed. In some example embodiments, the updating of the allocable region 312 in operation 640 may be performed each time a user device (e.g., a user device 150) requests the GUI 310.

Figure 7:
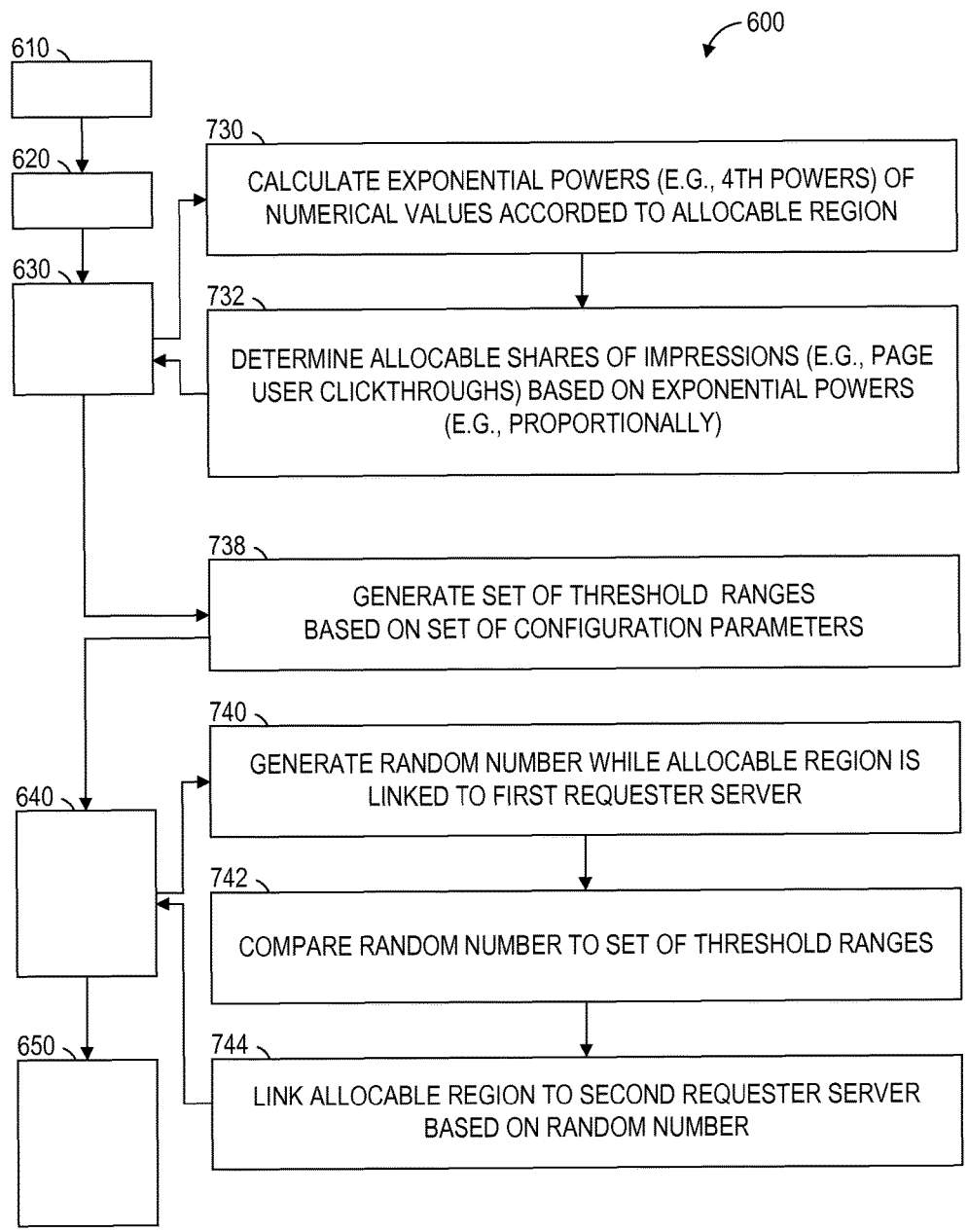

As shown in FIG. 7, the method 600 may include one or more of operations 730, 732, 738, 740, 742, and 744. One or both of operations 730 and 732 may be performed as part (e.g., a precursor task, a subroutine, or a portion) of operation 630, in which the item share allocator 230 generates a set of configuration parameters that defines the allocation plan for the allocable region 312. In operation 730, the item share allocator 230 calculates exponential powers of the numerical values received in the allocation requests. This may be performed by raising all of the numerical values to a common exponential power (e.g., squared, cubed, raised to the fourth power, or raised to the fifth power). In operation 732, the item share allocator 230 determines allocable shares (e.g., percentages) of impressions apportioned to the requesters (e.g., requesters 122, 132, and 142), and this determination of the allocable shares is based on the exponential powers (e.g., fourth powers) calculated in operation 730. For example, the allocable shares may be proportional to the exponential powers (e.g., fourth powers).

Operation 738 may be performed between operation 630 and 640. In operation 738, with the allocation plan for the allocable region 312 having been defined in operation 630, the item share allocator 230 generates a set of threshold ranges based on the set of configuration parameters that define the allocation plan. Each of the threshold ranges corresponds to a different requester (e.g., requester 122) among the requesters that submitted numerical values (e.g., requesters 122, 132, and 142, and seller 147). Accordingly, the threshold ranges include a first threshold range that corresponds to a first requester (e.g., requester 122), as well as a second threshold range that corresponds to the second requester (e.g., requester 132). In some example embodiments, the set of threshold ranges subdivide a normalized range (e.g., 0.0 to 1.0) into sub-ranges (e.g., percentages) that each correspond to a different requester (e.g., 0.00 to 0.39 for the requester 122, and 0.40 to 0.69 for the requester 132).

In example embodiments that include operation 738, operation 740, 742, and 744 are performed as part of operation 640, in which the item share provider 240 cyclically updates the allocable region 312. In operation 740, the item share provider 240 generates a random number while the allocable region 312 is linked (e.g., via the link 313) to a first server of the first requester (e.g., the requester server 120 of the requester 122). The random number may be generated within a normalized range (e.g., 0.0 to 1.0) or generated and then normalized to fit within the normalized range. In operation 742, the item share provider 240 compares the random number to one or more of the threshold ranges generated in operation 738. For example, the random number that the compared to at least the second threshold range that corresponds the second requester (e.g., 0.40 to 0.69 for the requester 132). In operation 744, the item share provider 240 links the allocable region 312 to a second server of the second requester (e.g., the requester server 130 of the requester 132) instead of the first server the first requester (e.g., requester server 120 of the requester 122). This linking (e.g., re-linking) is based on the random number falling within the second threshold range (e.g., 0.40 to 0.69 for the requester 132).

Since operation 640 may be performed each time a user device (e.g., user device 150) requests that the GUI 310 be presented, the combination of operations 740, 742, and 744 form all or part of a weighted randomization algorithm that causes the requester servers (e.g., requester servers 120, 130, and 140) to receive impressions (e.g., clickthroughs or page views) from the allocable region 312 according to the allocation plan (e.g., with shares of impressions allocated proportionally to fourth powers of the numerical values submitted by the requesters). This may have the effect of managing item sharing for the allocable region 312, such that the allocable region 312, its use, or its benefit is distributed to different requesters (e.g., requesters 122, 132, and 142) at different instances that the GUI 310 is presented (e.g., at different times at which the GUI 310 is presented), in a manner prescribed by the allocation plan whose configuration parameters were generated based on the numerical values accorded to the allocable region 312 by the requesters (e.g., requesters 122, 132, and 142).

Figure 8:
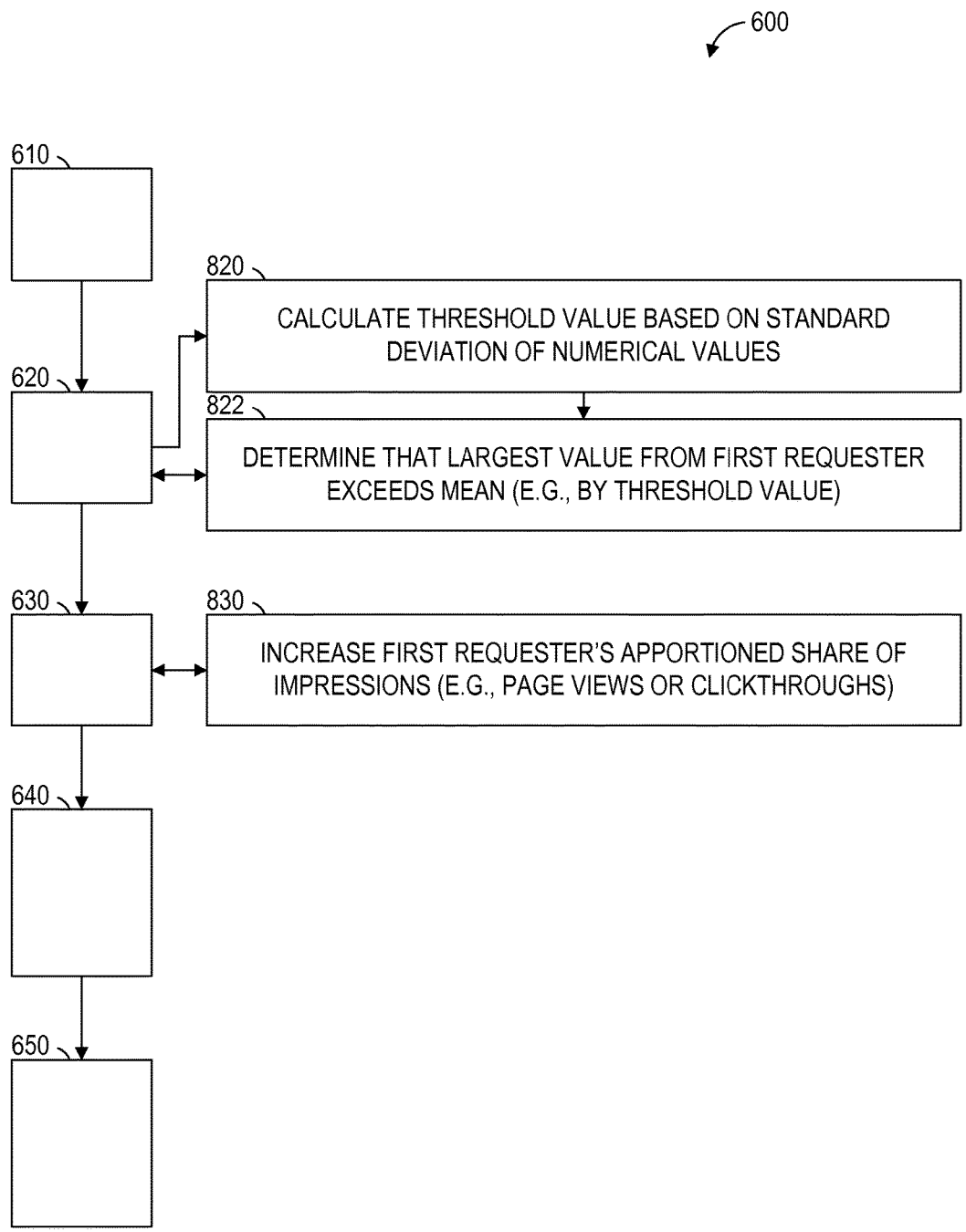

As shown in FIG. 8, some example embodiments of the method 600 include one or more of operations 820, 822, and 830. One or both of operations 820 and 822 may be performed as part of operation 620, in which the distribution analyzer 220 determines the distribution of the numerical values accorded to the allocable region 312 by the requesters (e.g., requesters 122, 132, and 142) that submitted numerical values. In operation 820, the distribution analyzer 220 calculates a threshold value (e.g., a threshold distance value), and this threshold value may be calculated based on a standard deviation of the numerical values received in the allocation requests in operation 610. For example, the threshold value may be calculated as an integer multiple (e.g., 2×, 3×, or 4×) of the standard deviation. In operation 822, the distribution analyzer 220 determines that the largest numerical value (e.g., received from the requester server 120 of the requester 122) among the numerical values exceeds the average (e.g., arithmetic mean) of the numerical values. In certain example embodiments, the distribution analyzer 220 determines that the largest numerical value exceeds the average by at least the threshold value calculated in operation 820.

In response to the determination performed in operation 820, the item share allocator 230 may perform operation 830 as part of operation 630, in which the configuration parameters that define the allocation plan are generated. In operation 830, the item share allocator 230 increases the share of the impressions (e.g., clickthroughs, page views, or both) allocated to the server (e.g., requester server 120) of the requester (e.g., requester 122) that accorded the largest numerical value to the allocable region 312. In some example embodiments, this increase is applied to the result of a default algorithm for allocating shares of the impressions (e.g., allocations that are proportional to fourth powers of the numerical values). This may have the effect of amplifying the influence of the highest numerical value (e.g., providing a bonus for submitting the highest bid price) and thus rewarding or incentivizing the requester (e.g., requester 122) that accorded the highest numerical value to the allocable region 312.

Figure 9:
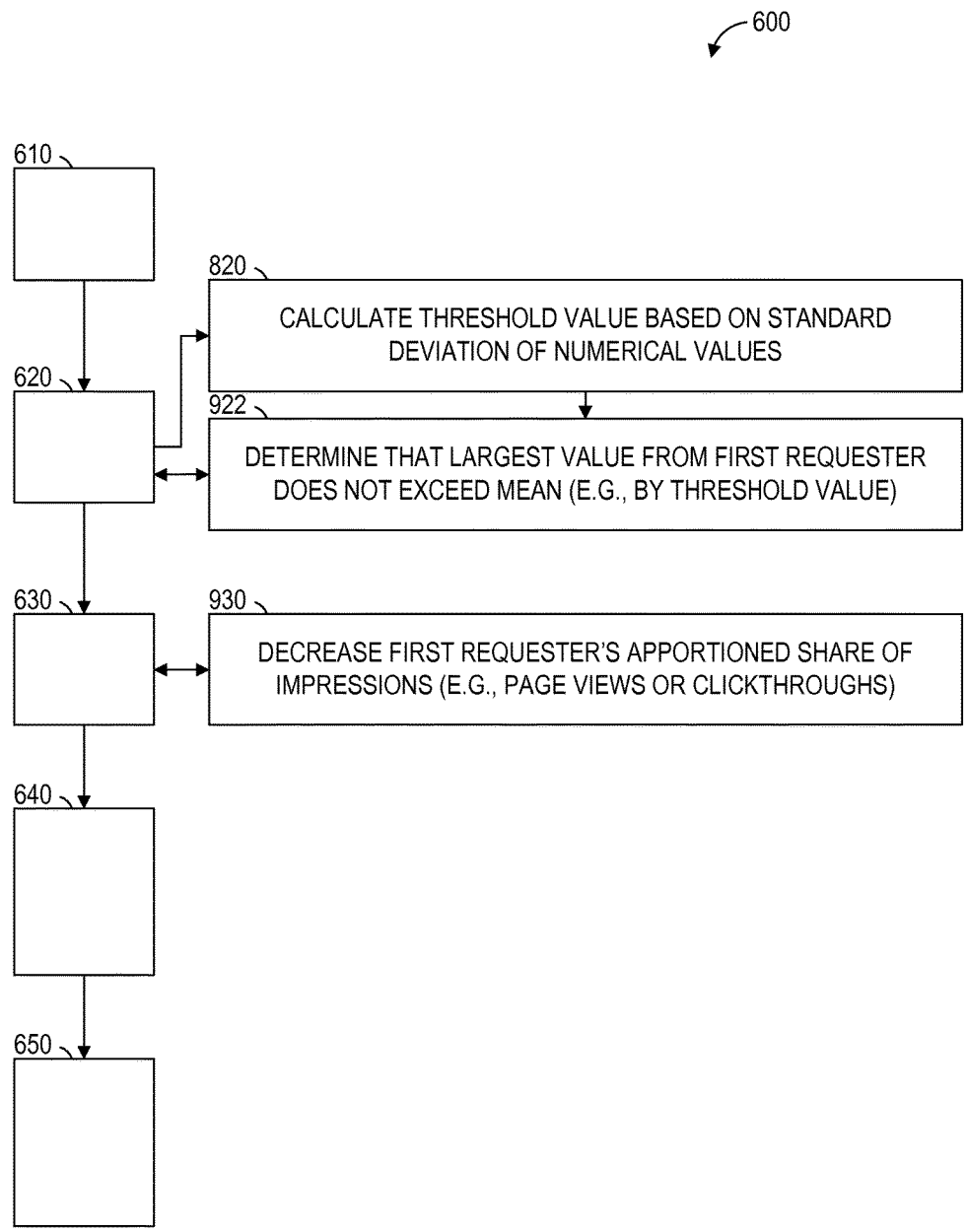

As shown in FIG. 9, some example embodiments of the method 600 include one or more of operations 820 (e.g., described above with respect to FIG. 8), 922, and 930. In such example embodiments, operation 820 is performed in a manner similar to that described above with respect to FIG. 8, and one or both of operations 820 and 922 may be performed as part of operation 620, in which the distribution analyzer 220 determines the distribution of the numerical values accorded to the allocable region 312 by the requesters (e.g., requesters 122, 132, and 142, and seller 147). As noted above, in operation 820, the distribution analyzer 220 calculates a threshold value (e.g., a threshold distance value, which may be calculated based on the standard deviation of the numerical values). In operation 922, the distribution analyzer 220 determines that the largest numerical value (e.g., received from the requester server 120 of the requester 122) among the numerical values fails to exceed the average (e.g., mean) of the numerical values. In certain example embodiments, the distribution analyzer 220 determines that the largest numerical value does not exceed the average by at least the threshold value calculated in operation 820. In alternative example embodiments, the distribution analyzer 220 determines that the largest numerical value itself does not exceed the threshold value.

In response to the determination performed in operation 820, the item share allocator 230 may perform operation 930 as part of operation 630, in which the configuration parameters that define the allocation plan are generated. In operation 930, the item share allocator 230 decreases the share of the impressions (e.g., clickthroughs, page views, or both) allocated to the server (e.g., requester server 120) of the requester (e.g., requester 122) that accorded the largest numerical value to the allocable region 312. In some example embodiments, this increase is applied to results of a default algorithm for allocating shares of the impressions (e.g., allocations that are proportional to fourth powers of the numerical values). In some example embodiments, this may have the effect of attenuating the influence of the highest numerical value (e.g., providing a penalty for submitting a highest bid price that does not exceed the average bid price by at least the threshold value) and thus discouraging or providing a disincentive to the requester (e.g., requester 122) that accorded the highest numerical value to the allocable region 312. In other example embodiments, this may have the effect of penalizing a requester (e.g., requester 122) that did not accord a meaningful or serious numerical value.

Figure 10:
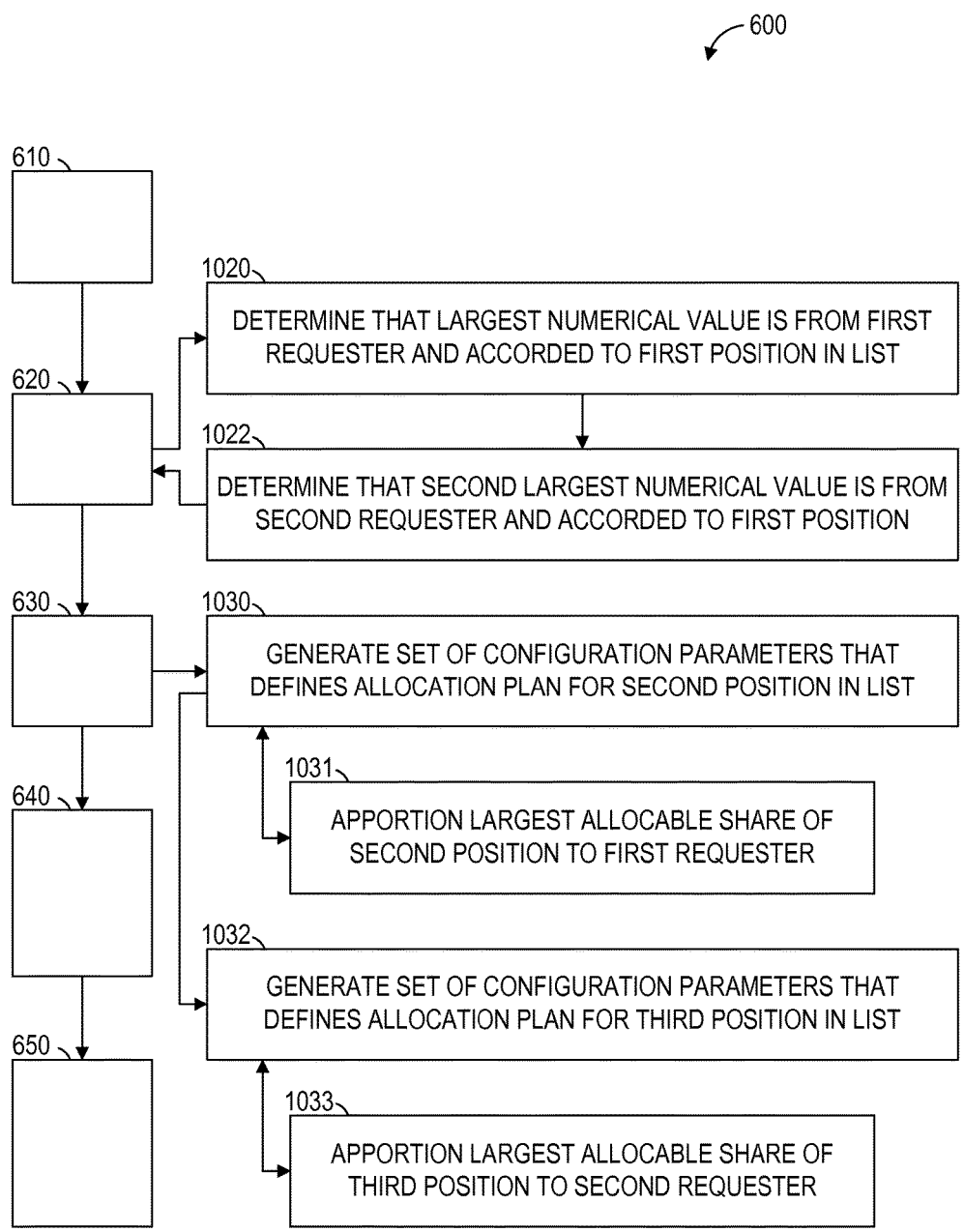

As shown in FIG. 10, some example embodiments of the method 600 include one or more of operations 1020, 1022, 1030, 1031, 1032, and 1033. In such example embodiments, the first position 410 in the list 400 of requesters is a first allocable region (e.g., similar to the allocable region 312) within the GUI 310, and the second position 420 in the list 400 of requesters is a second allocable region (e.g., also similar to the allocable region 312) within the GUI 310. Accordingly, the item share allocator 230 can define separate allocation plans (e.g., by generating separate sets of configuration parameters) for the first and second allocable regions.

In this context, one or both of operations 1020 and 1022 may be performed as part of operation 620, in which the distribution analyzer 220 determines the distribution of the numerical values. In operation 1020, the distribution analyzer 220 determines a largest (e.g., first largest) numerical value among the numerical values accorded to the first position 410 (e.g., the first allocable region) by the requesters (e.g., requesters 122, 132, and 142). For example, this largest numerical value may have been accorded to the first position 410 by the requester 122 (e.g., the first requester). As will be detailed below, this largest numerical value accorded to the first position 410 may be used—not only to influence the allocation of the first position 410 (e.g., first allocable region)—but also to influence the allocation of the second position 420 (e.g., second allocable region) in the list 400 of requesters.

In operation 1022, the distribution analyzer 220 determines that a next-largest (e.g., second-largest) numerical value among the numerical values accorded to the same first position 410. For example, this next-largest numerical value may have been accorded to the first position 410 by the requester 132 (e.g., the second requester). As will be detailed below, this next-largest numerical value accorded to the first position 410 may be used—not only to influence the allocation of the first position 410 (e.g., first allocable region)—but also to influence the allocation of the third position 430 (e.g., third allocable region) in the list 400 of requesters.

One or more of operations 1030, 1031, 1032, and 1032 may be performed as part of operation 630, in which the item share allocator 230 generates sets of configuration parameters that define allocation plans for various allocable regions (e.g., positions 410-430) of the GUI 310, according to certain example embodiments. For example, in operation 630, the item share allocator 330 may generate a first set of configuration parameters that define a first allocation plan for the first position 410 in the list 400 of requesters. In addition, in operation 1030, the item share allocator 230 generates a second set of configuration parameters that defines a second allocation plan for the second position 420 in the list 400 of requesters. Performance of operation 1030 may thus have the effect of creating or otherwise defining the second allocation plan for the second position 420. The generation of the second set of configuration parameters may again be based on the distribution of the numerical values, as determined in operation 620.

In some example embodiments, operation 1031 may be performed as part of operation 1030. In operation 1031, the item share allocator 230 apportions the largest allocable share of the second position 420 (e.g., a second allocable region) to the requester 122 (e.g., the first requester) that accorded the largest (e.g., first largest) numerical value to the first position 410 (e.g., the first allocable region). That is, the largest allocable share of the second position 420 is apportioned to the requester 122 (e.g., the first requester), based on the requester 122 having accorded the largest numerical value to the first position 410. For example, if the largest numerical value (e.g., highest bid price) for the first position 410 was accorded to the first position 410 by the requester 122, the item share allocator 230 apportions the largest allocable share (e.g., 65% of all impressions) of the second position 420 to the same requester 122 (e.g., in addition to apportioning a share of the first position 410 to that requester 122).

In operation 1032, the item share allocator 230 generates a third set of configuration parameters that defines a third allocation plan for the third position 430 in the list 400 of requesters. Performance of operation 1032 may accordingly have the effect of creating or otherwise defining the third allocation plan for the third position 430. The generation of the third set of configuration parameters may again be based on the distribution of the numerical values, as determined in operation 620.

In certain example embodiments, operation 1033 may be performed as part of operation 1032. In operation 1033, the item share allocator 230 apportions the largest allocable share of the third position 430 (e.g., a third allocable region) to the requester 132 (e.g., the second requester) that accorded the next-largest (e.g., second largest) numerical value to the first position 410 (e.g., the first allocable region). That is, the largest allocable share of the third position 430 is apportioned to the requester 132 (e.g., the second requester), based on the requester 132 having accorded the second-largest (e.g., smaller than the first largest numerical value but larger than all other numerical values) numerical value to the first position 410. For example, if the second-largest numerical value (e.g., second-highest bid price) for the first position 410 was accorded to the first position 410 by the requester 132, the item share allocator 230 apportions the largest allocable share (e.g., 68% of all impressions) of the third position 430 to the same requester 132 (e.g., in addition to apportioning some share of the first position 410 to that requester 132, as well as possibly apportioning some share of the second position 420 to that requester 132).

Figure 11:
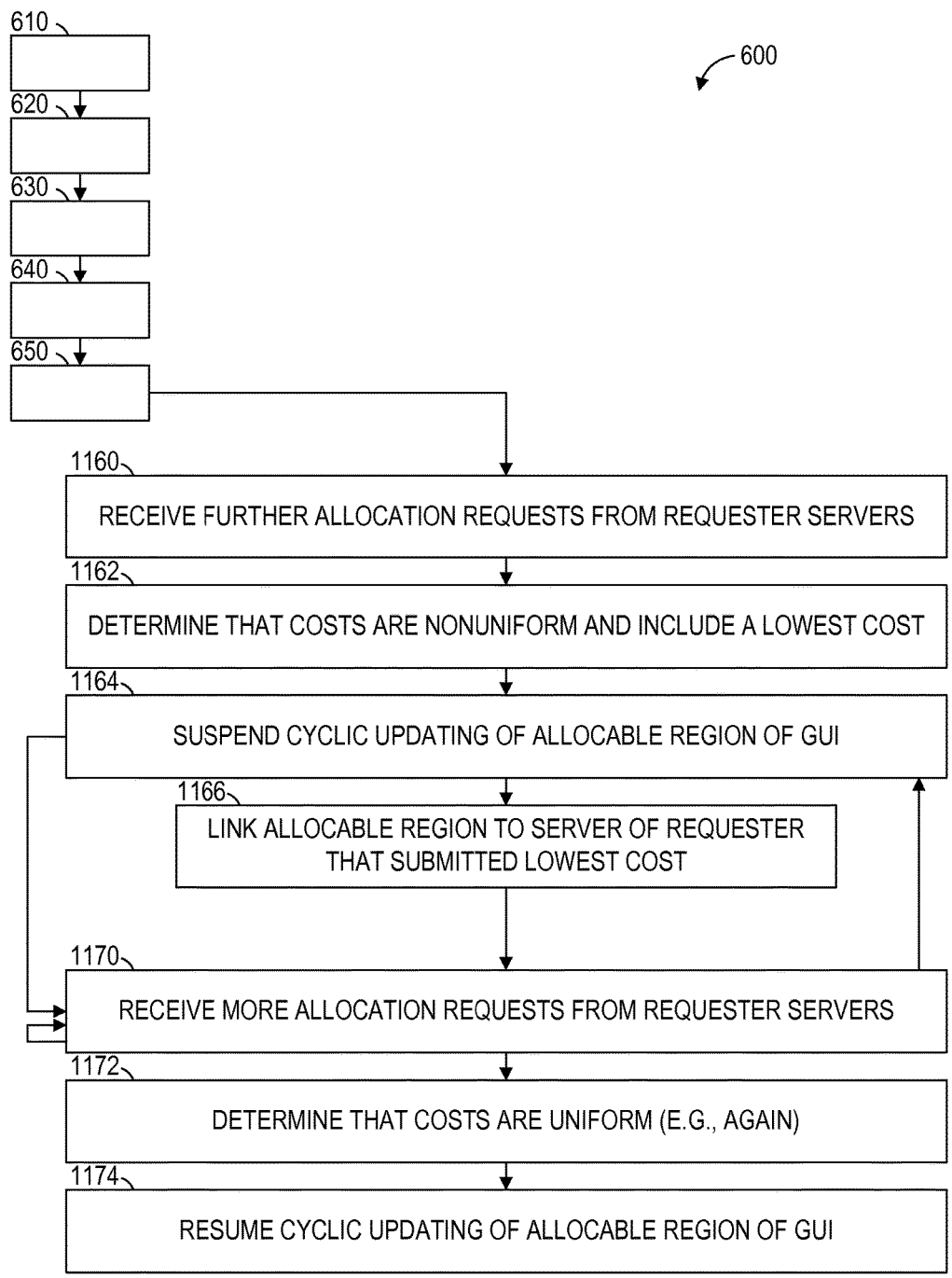

As shown in FIG. 11, some example embodiments of the method 600 include one or more of operations 1160, 1162, 1164, 1166, 1170, 1172, and 1174. In such example embodiments, the repeated updating and presenting of the allocable region 312 in operations 640 and 650 progresses as described above so long as the allocation requests received in operation 610 specify a uniform (e.g., shared in common) cost for a purchasable product (e.g., an item, such as a good or service) advertised or to be advertised by the allocable region 312. For example, if the allocable region 312 advertises a hotel accommodation, the allocation requests may specify costs charged by the various requesters (e.g., requesters 122, 132, and 142) for booking that hotel accommodation, in addition to specifying the numerical values (e.g., bids) accorded to the allocable region 312 by the requesters. So long as these booking costs are exactly the same (e.g., $300 per night), operation 640 and 650 may be performed on an ongoing default basis, according to various example embodiments. However, the default behavior can be overridden (e.g., temporarily or permanently suspended) when the costs for the product are nonuniform, and a lowest cost is specified by an allocation request from one of the requesters (e.g., requester 142).

In operation 1160, the share request receiver 210 receives allocation requests (e.g., additional allocation requests) each communicated from a different one of the requester servers (e.g., requester servers 120, 130, and 140). In some example embodiments, a further additional allocation request is also received by the share request receiver 210 from the seller server 145. Operation 1160 may be performed similarly to operation 610.

In operation 1162, the share request receiver 210 determines that the costs specified in the allocation requests received in operation 1160 are nonuniform (e.g., not all the same) and include a lowest cost (e.g., $298 per night) specified in the allocation request from the requester 142. This determination may be performed by comparing the costs specified in the allocation requests.

In operation 1164, the item share allocator 230 suspends the cyclic updating of the allocable region 312 discussed above with respect operation 640. The suspension may be based on the results of operation 1162 (e.g., based on the determination that the costs include a lowest cost).

In operation 1166, while the cyclic updating is suspended, the item share allocator 230 links the allocable region 312 to the requester server 140 (e.g., a first requester server) of the requester 142 (e.g., a first requester) that submitted the lowest cost for the product. That is, this linking may be in response to the lowest cost corresponding to the requester 142. In some example embodiments, this linking causes the link 313 to reference the requester server 140 (e.g., until costs for the product are uniform again).

In operation 1170, the share request receiver 210 receives more allocation requests from the requester servers 120, 130, and 140. As in operation 1160, a further allocation request may also be received from the seller server 145.

In operation 1172, the share request receiver 210 determines that the costs specified in the allocation requests received in operation 1170 are uniform (e.g., again) and do not include a lowest cost (e.g., anymore). As above, this determination may be performed by comparing the costs specified in the allocation requests.

In operation 1174, the item share allocator 230 resumes the cyclic updating of the allocable region 312 discussed above with respect to operation 640. That is, the item share allocator 230 terminates the suspension of the cyclic updating and restores default behavior based on the results of operation 1172 (e.g., in response to the determination that the costs are uniform again). Accordingly, performance of operations 1160-1172 may have the effect of rewarding or incentivizing a requester (e.g., requester 142) that is willing to advertise a product cost lower than the other requesters (e.g., requester 122, requester 132, and seller 147).

Figure 12:
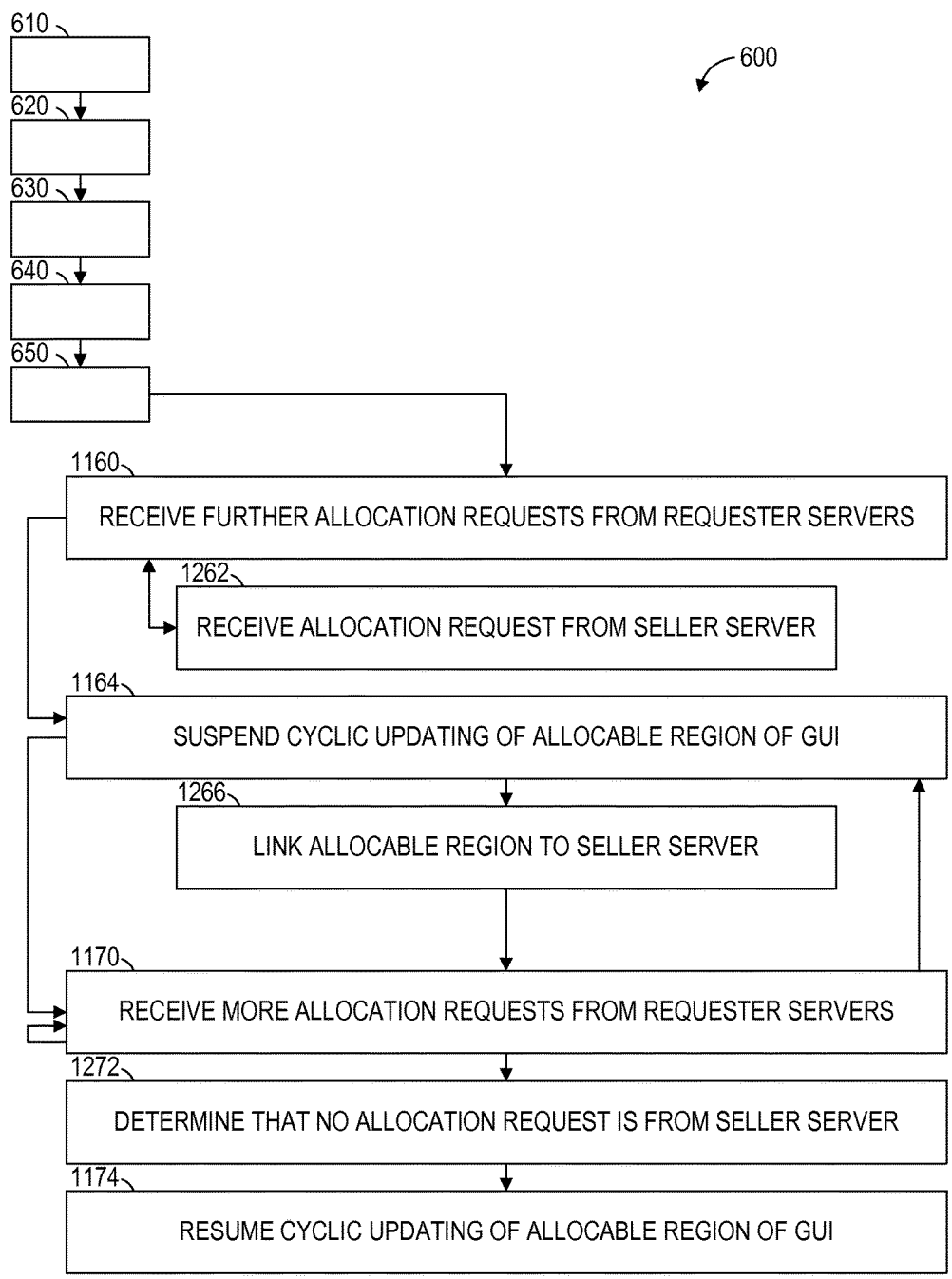

As shown in FIG. 12, some example embodiments of the method 600 include operations 1160 (e.g., described above with respect to FIG. 11), 1262, 1164 (e.g., described above with respect to FIG. 11), 1266, 1170 (e.g., described above with respect to FIG. 11), 1272, and 1174 (e.g., described above with respect to FIG. 11. In such example embodiments, the default behavior discussed above with respect to operation 640 and 650 is suspended when the seller 147 of the purchasable product (e.g., a hotel accommodation) submits an allocation request for the allocable region 312, and the default behavior is resumed when the seller 147 stop submitting allocation requests.

Operation 1160 in FIG. 12 generally proceeds as described above with respect to FIG. 11, except that the share request receiver 210 receives an allocation request from the seller server 145 among the allocation requests from the requester servers (e.g., the requester servers 120, 130, and 140). The receiving of this particular allocation request from the seller server 145 is shown as operation 1262, which may be performed as part of operation 1160. The allocation request from the seller server 145 may be identified by a server identifier within the allocation request for a network identifier of the seller server 145 (e.g., domain name or network address). According to various example embodiments, the allocation request received from the seller server 145 may specify a corresponding cost for the product and may specify a corresponding numerical value accorded to the allocable region 312 by the seller 147.

Operation 1164 in FIG. 12 generally proceeds as described above with respect to FIG. 11. As noted above, the item share allocator 230 suspends the cyclic updating of the allocable region 312 discussed above with respect operation 640, and the suspension may be based on the results of operation 1262 (e.g., detection of the allocation request from the seller server 145 among the allocation requests).

In operation 1266, while the cyclic updating is suspended, the item share allocator 230 links the allocable region 312 to the seller server 145 of the seller 147 that submitted an allocation request for the allocable region 312. This linking may be in response to the detection of the allocation request coming from the seller server 145. In some example embodiments, this linking causes the link 313 to reference the seller server 145 (e.g., until the seller server 145 stops sending allocation requests).

Operation 1170 in FIG. 12 generally proceeds as described above with respect to FIG. 11, and, as noted above, the additional allocation requests received by the share request receiver 210 may include a further allocation request received from the seller server 145. However, the additional allocation requests may also lack any allocation request from the seller server 145.

In operation 1272, the share request receiver 210 determines that no allocation request received in operation 1170 is from the seller server 145. That is, the share request receiver may determine that the seller server 145 has stopped sending allocation requests.

Operation 1174 in FIG. 12 generally proceeds as described above with respect to FIG. 11. As noted above, the item share allocator 230 resumes the cyclic updating of the allocable region 312 discussed above with respect to operation 640. That is, the item share allocator 230 terminates the suspension of the cyclic updating and restores default behavior based on the results of operation 1272 (e.g., in response to the determination that the seller server 145 has stopped sending allocation requests). Accordingly, performance of operations shown in FIG. 12 may have the effect of rewarding or incentivizing a seller (e.g., seller 147) that is willing to compete with the other requesters (e.g., the requesters 122, 132, and 142).

Figure 13:
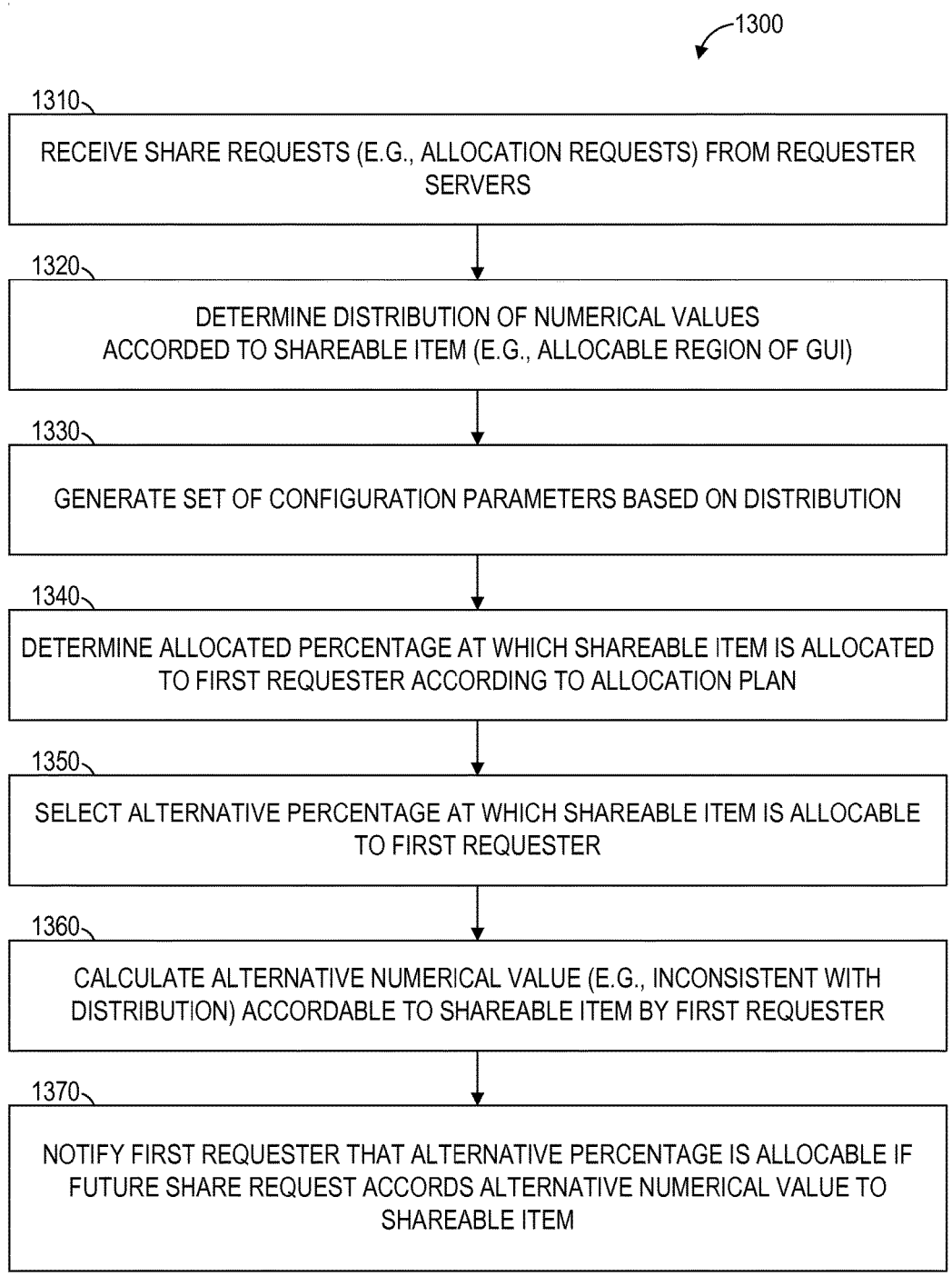
FIGS. 13-16 are flowcharts illustrating operations of the item sharing machine in performing a method of interactively sharing a shareable item (e.g., the allocable region of the GUI), according to some example embodiments.

FIGS. 13-16 are flowcharts illustrating operations of the item sharing machine 110 in performing a method 1300 of interactively sharing a shareable item (e.g., the allocable region 312 of the GUI 310 or one of the positions 410-440 in the list 400 of requesters in the GUI 310), according to some example embodiments. Operations in the method 1300 may be performed by the item sharing machine 110, using components (e.g., modules) described above with respect to FIG. 2, using one or more processors (e.g., microprocessors or other hardware processors), or using any suitable combination thereof. As shown in FIG. 13, the method 1300 includes operations 1310, 1320, 1330, 1340, 1350, 1360, and 1370.

In operation 1310, the share request receiver 210 receives share requests (e.g., allocation requests, which may include submissions of bids) each communicated from a different one of the requester servers 120, 130, and 140. Operation 1310 may be performed in a manner similar to operation 610. In some example embodiments, an additional share request is also received by the share request receiver 210 from the seller server 145. The share requests are submitted by at least the requesters 122, 132, and 142 for the shareable item (e.g., allocable region 312), and the share requests specify numerical values (e.g., bid prices) that have been accorded to the shareable item by at least the requesters 122, 132, and 142.

In operation 1320, the distribution analyzer 220 determines a distribution (e.g., spread) of the numerical values accorded to the shareable item (e.g., the allocable region 312). Operation 1320 may be performed in a manner similar to operation 620 and accordingly may include performance of one or more statistical calculations (e.g., calculating a maximum, a minimum, one or more relative maxima, one or more relative minima, an average, a median, a standard deviation, or any suitable combination thereof).

In operation 1330, the item share allocator 330 generates a set of configuration parameters that defines an allocation plan for the shareable item (e.g., the allocable region 312). Operation 1330 may be performed in a manner similar to operation 630 and thus may have the effect of creating or otherwise defining the allocation plan. The generation of the configuration parameters is based on the distribution of the numerical values, as determined in operation 1320. According to various example embodiments, the set of configuration parameters defines allocable shares of the shareable item and apportions the allocable shares to the requesters that submitted share requests (e.g., at least the requesters 122, 132, and 142).

In operation 1340, the share request recommender 250 determines an allocated percentage (e.g., 35%) at which the shareable item is allocated to the requester 122 (e.g., a first requester), the corresponding requester server 120 (e.g., a first requester server), or both. This determination is made based on the set of configuration parameters that defines the allocation plan for the shareable item, and the allocated percentage is therefore determined in accordance with the set of configuration parameters.

In operation 1350, the share request recommender 250 selects an alternative percentage (e.g., 70%) at which the shareable item is allocable to the same requester 122, the same corresponding requester server 120, or both. The alternative percentage may be selected from among an available set of alternative percentages (e.g., a range from 5% to 95%, available in 5% increments).

In operation 1360, the share request recommender 250 calculates an alternative numerical value (e.g., an alternative bid price) accordable to the shareable item by the requester 122 (e.g., the first requester). That is, the alternative numerical value may be a suggested, recommended, proposed, or hypothetical numerical value that would obtain the alternative percentage of the shareable item for the requester 122, if the requester 122 were to accord the alternative numerical value to the shareable item in a future (e.g., subsequent) share request (e.g., and if all other requesters do not change their numerical values). The calculation of the alternative numerical value may be based on the distribution determined in operation 1320, but results in the alternative numerical value being inconsistent with that distribution. In other words, if the requester 122 were to adopt the alternative numerical value, while all other numerical values specified in the share requests remained the same, a different distribution would result (e.g., from performance of operation 1320).

In operation 1370, the share request recommender 250 causes presentation of a notification that the shareable item (e.g., the allocable region 312 or one of the positions 410-440 in the list 400 of requesters) is allocable to the requester 122 (e.g., first requester) at the alternative percentage (e.g., 70%) conditioned upon reception of a future share request that would indicate that the requester 122 accords the alternative numerical value (e.g., alternative bid price) to the shareable item (e.g., and conditioned upon all other requesters maintaining their numerical values constant). The causing of the notification to be presented may include causing the requester server 120 (e.g., a first computer) that corresponds to the requester 122 to present the notification (e.g., on a display). This may have the effect of notifying the requester 122 that the alternative percentage of the shareable item can be obtained by the requester 122, if the requester 122 submits a future share request that accords the alternative numerical value to the shareable item. According to various example embodiments, the notification may take the example form of a spreadsheet that indicates multiple alternative numerical values corresponding to multiple alternative percentages, which may accordingly provide the requester 122 with several selectable choices for submitting one or more future share requests.

Figure 14:
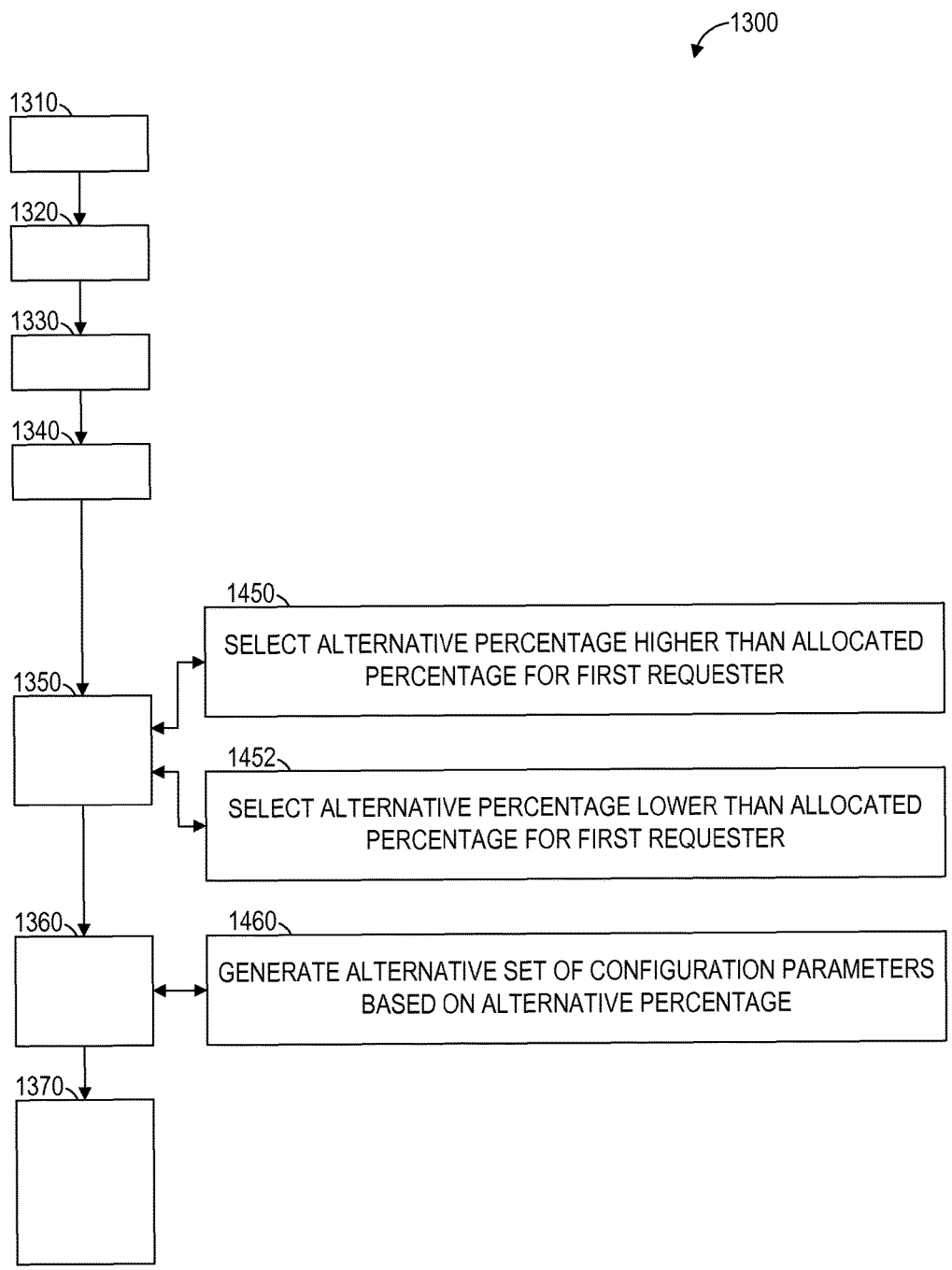

As shown in FIG. 14, some example embodiments of the method 1300 include one or more of operations 1450, 1452, and 1460. Either operation 1450 or operation 1452 may be performed as part (e.g., a precursor task, a subroutine, or a portion) of operation 1350, in which the share request recommender 250 selects the alternate percentage (e.g., from among a set of available alternative percentages). In operation 1450, the share request recommender 250 selects an alternative percentage (e.g., 70%) that is higher than the allocated percentage (e.g., 35%) currently allocated to the requester 122 (e.g., the first requester). In operation 1452, the share request recommender 250 selects an alternative percentage (e.g., 20%) that is lower than the allocated percentage (e.g., 35%) currently allocated to the requester 122 (e.g., the first requester).

Operation 1460 may be performed as part of operation 1360, in which the share request recommender 250 calculates an alternative numerical value. In operation 1460, the share request recommender 250 generates an alternative set of configuration parameters that defines an alternative allocation plan (e.g., distinct from the allocation plan defined in operation 1330) by which the shareable item is allocable to the requester 122 (e.g., the first requester), its corresponding requester server 120, or both, at the alternative percentage. In example embodiments that include operation 1450, the alternative allocation plan allocates the shareable item to the requester 122, the requester server 120, or both, at the alternative percentage (e.g., 70%) that is higher than the currently allocated percentage (e.g., 35%). In example embodiments that include operation 1452, the alternative allocation plan allocates the shareable item to the requester 122, the requester server 120, or both, at the alternative percentage (e.g., 20%) that is lower than the currently allocated percentage (e.g., 35%). The generating of the alternative set of configuration parameters in operation 1460 is based on the alternative percentage that was selected in operation 1350.

Figure 15:
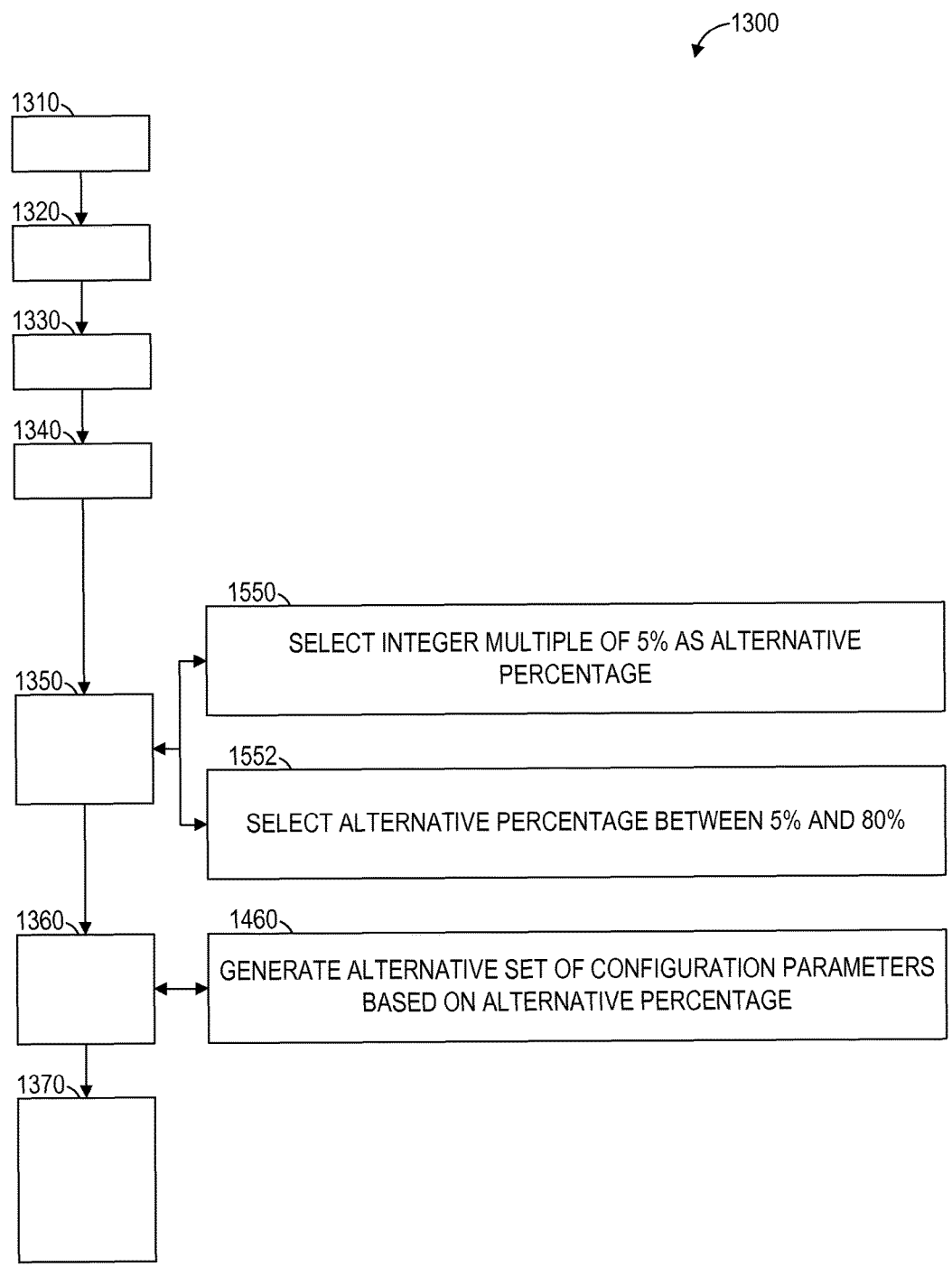

As shown in FIG. 15, some example embodiments of the method 1300 include one or more of operations 1550, 1552, and 1460 (e.g., described above with respect to FIG. 14). One or both of operations 1550 and 1552 may be performed as part of operation 1350, in which the share request recommender 250 selects the alternative percentage. In operation 1550, the share request recommender 250 selects an integer multiple of five percent (5%) as the alternative percentage (e.g., 5%, 10%, 15%, 45%, 50%, 55%, or 95%). In example embodiments that include operation 1550, operation 1460 generally proceeds as described above with respect to FIG. 14 (e.g., performed as part of operation 1360) and specifically includes generating the alternative set of configuration parameters based on the integer multiple of five percent selected in operation 1550. This may have the effect of causing the notification to be presented in operation 1370 to include an alternative percentage that is quick, convenient, straightforward, or otherwise helpful to the requester 122 in understanding the effect of the alternative numerical value suggested in the notification.

In operation 1552, the share request recommender 250 selects the alternative percentage from a range of five percent (5%) and eighty percent (80%). That is, the share request recommender 250 selects the alternative percentage such that the alternative percentage is between five percent and eighty percent (e.g., inclusively). In example embodiments that include operation 1552, operation 1460 generally proceeds as described above with respect to FIG. 14 (e.g., performed as part of operation 1360) and specifically includes generating an alternative set of configuration parameters based on the selected alternative percentage ranging from five percent to eighty percent. This may have the effect of causing the notification to be presented in operation 1370 to include an alternative percentage that avoids either extremes in potential alternative percentages (e.g., 1%, 4%, 97%, or 99%) or corresponding extremes in according numerical values to the shareable item (e.g., according very low or very high numerical values to the shareable item). Accordingly, selection of an alternative percentage between five percent and eighty percent may be more efficient in terms of reducing computational complexity, as well as providing recommendations more likely to be useful to the requester 122.

Figure 16:
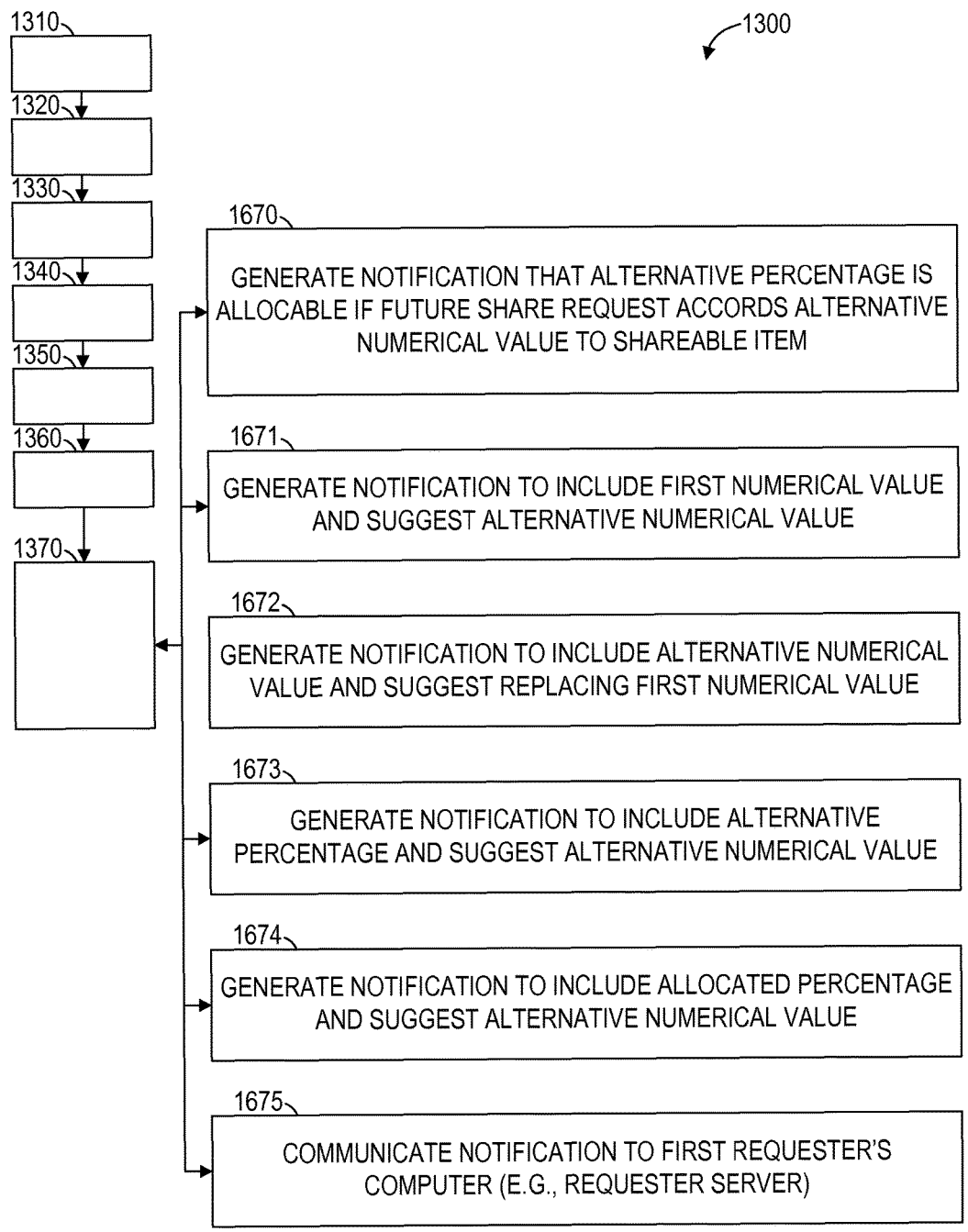

As shown in FIG. 16, some example embodiments of the method 1300 include one or more of operations 1670, 1671, 1672, 1673, 1674, and 1675, any one or more of which may be performed as part of operation 1370, in which the share request recommender 250 causes presentation of the notification that the shareable item (e.g., the allocable region 312) is allocable to the requester 122 (e.g., first requester) at the alternative percentage (e.g., 70%), if the item sharing machine 110 receives a future share request indicating that the requester 122 accords the alternative numerical value to the shareable item.

In operation 1670, the share request recommender 250 generates the notification to include an indication that the shareable item is allocable to the requester 122 at the alternative percentage conditioned upon reception of a future (e.g., subsequent) share request in which the requester 122 accords the alternative value to the shareable item. For example, supposing the shareable item is the allocable region 312 in the example form of a graphical button within the GUI 310, the notification may include a message such as, "If you increase your offer to $3.50 per click, you can get 75% of the clicks from this button."

In operation 1671, the share request recommender 250 generates the notification to include the current numerical value (e.g., first numerical value) accorded to the shareable item by the requester 122 (e.g., the first requester). The share request recommender 250 may also incorporate a suggestion into the notification. Specifically, the notification may include a suggestion that the alternative numerical value replace the current numerical value. For example, supposing the shareable item is the allocable region 312 in the example form of a graphical button within the GUI 310, and supposing the current numerical value accorded to the shareable item by the requester 122 is $2.25 per click, the notification may be generated to include a message such as, "If you replace your offer of $2.25 per click with a new offer of $3.50 per click, you can get 75% of the clicks from this button."

In operation 1672, the share request recommender 250 generates the notification to include the alternative numerical value accordable to the shareable item by the requester 122. The share request recommender 250 may also incorporate a suggestion into the notification. Specifically, the notification may include a suggestion that the alternative numerical value replace the current numerical value. For example, supposing the shareable item is the allocable region 312 in the example form of a graphical button within the GUI 310, and supposing the alternative numerical value is $4.75 per click, the notification may be generated to include a message such as, "If you replace your offer of $2.25 per click with the new offer of $4.75 per click, you can get 75% of the clicks from this button."

In operation 1673, the share request recommender 250 generates the notification to include the alternative percentage selected in operation 1350. The share request recommender 250 may also incorporate a suggestion into the notification. Specifically, the notification may include a suggestion that the alternative numerical value be accorded to the shareable item (e.g., to obtain the alternative percentage). For example, supposing the shareable item is the allocable region 312 in the example form of a graphical button within the GUI 310, and supposing the alternative numerical value is $1.50 per click, the notification may be generated to include a message such as, "If you bid $1.50 per click, you can get 60% of the clicks from this button."

In operation 1674, the share request recommender 250 generates the notification to include the currently allocated percentage allocated to the requester 122, the requester server 120, or both. The share request recommender 250 may also incorporate a suggestion into the notification. Specifically, the notification to include a suggestion that the alternative value be accorded to the shareable item (e.g., to replace the currently allocated percentage with the alternative percentage). For example, supposing the shareable item is the allocable region 312 in the example form of a graphical button within the GUI 310, and supposing the currently allocated percentage is 40%, the notification may be generated to include a message such as, "If you bid $1.50 per click next time, you can increase your apportionment from 40% to 65%."

In operation 1675, the share request recommender 250 communicates the notification to the requester server 120 (e.g., the first requester's computer). This may have the effect of causing the requester server 120 to present the notification (e.g., generated according to any one or more of operations 1670-1674).

According to various example embodiments, one or more of the methodologies described herein may facilitate linking an allocable region of a GUI (e.g., repeatedly re-linking the allocable region 312 of the GUI 310). Moreover, one or more of the methodologies described herein may facilitate interactive sharing of a shareable item (e.g., the allocable region 312 of the GUI 310). As a direct result, one or more of the methodologies described herein may facilitate allocation and routing of network traffic, including facilitation of commercial network services (e.g., provided by a commercial network server) that allocate and route network traffic (e.g., internet traffic), as well as load-balancing of network servers (e.g., requester servers 120, 130, and 140) in accordance with numerical values that may indicate their respective capacities for receiving and processing network traffic, among other things.

When these effects are considered in aggregate, one or more of the methodologies described herein may obviate a need for certain efforts or resources that otherwise would be involved in linking an allocable region of a GUI, interactively sharing a shareable item, allocating and routing of network traffic (e.g., page view requests or clickthroughs), and load-balancing of network servers based on received numerical indications of their respective (e.g., dynamically changing) capacities for receiving and processing network traffic. Efforts expended by a user in performing any one or more of these functions may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 17:
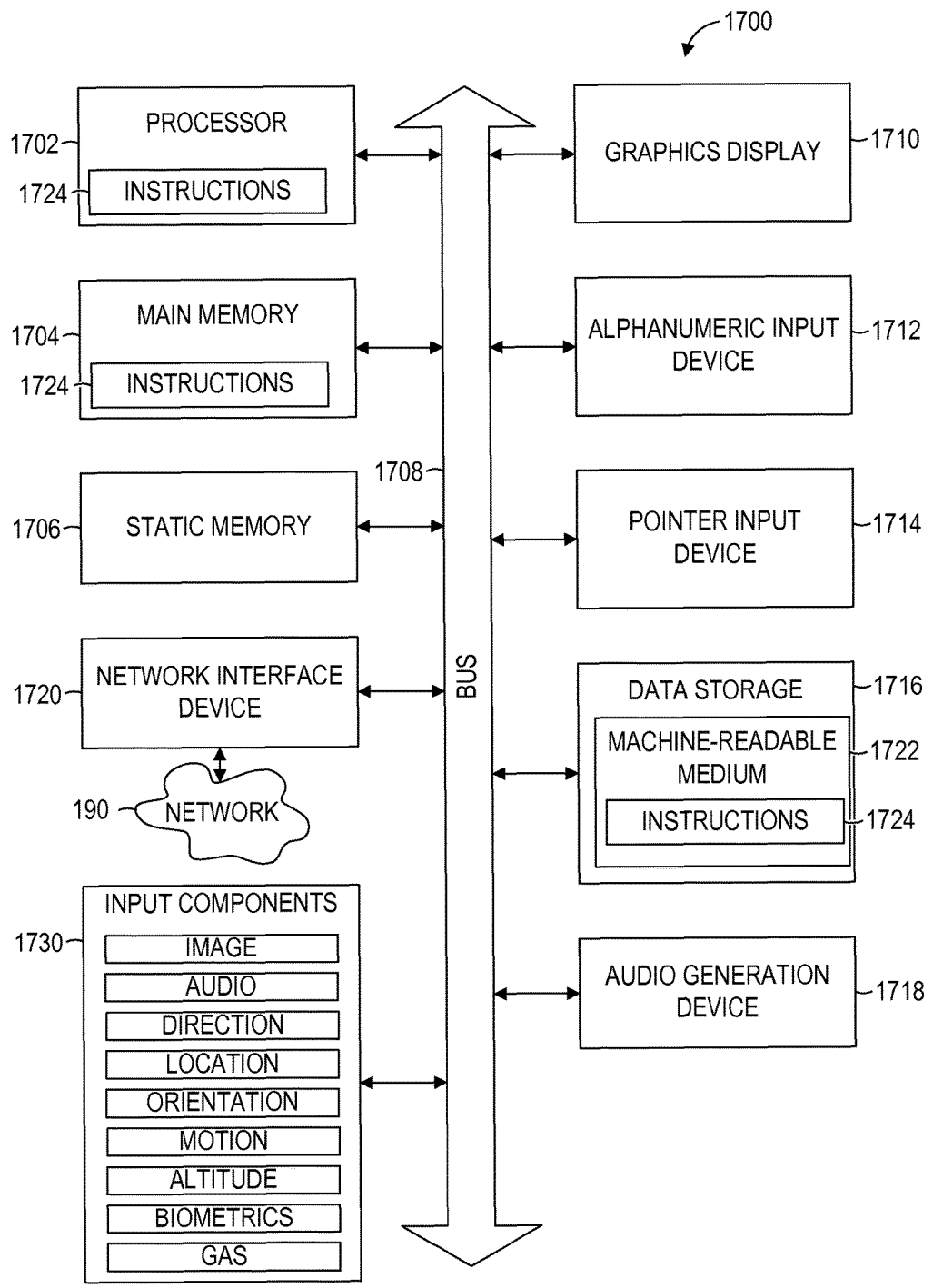
FIG. 17 is a block diagram illustrating components of a machine, according to some example embodiments, able to read instructions from a machine-readable medium and perform any one or more of the methodologies discussed herein.

FIG. 17 is a block diagram illustrating components of a machine 1700, according to some example embodiments, able to read instructions 1724 from a machine-readable medium 1722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 17 shows the machine 1700 in the example form of a computer system (e.g., a computer) within which the instructions 1724 (e.g., software, a program, an application, an applet, an app, or other executable code) for causing the machine 1700 to perform any one or more of the methodologies discussed herein may be executed, in whole or in part.

In alternative embodiments, the machine 1700 operates as a standalone device or may be communicatively coupled (e.g., networked) to other machines. In a networked deployment, the machine 1700 may operate in the capacity of a server machine or a client machine in a server-client network environment, or as a peer machine in a distributed (e.g., peer-to-peer) network environment. The machine 1700 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1724, sequentially or otherwise, that specify actions to be taken by that machine. Further, while only a single machine is illustrated, the term "machine" shall also be taken to include any collection of machines that individually or jointly execute the instructions 1724 to perform all or part of any one or more of the methodologies discussed herein.

The machine 1700 includes a processor 1702 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1704, and a static memory 1706, which are configured to communicate with each other via a bus 1708. The processor 1702 contains solid-state digital microcircuits (e.g., electronic, optical, or both) that are configurable, temporarily or permanently, by some or all of the instructions 1724 such that the processor 1702 is configurable to perform any one or more of the methodologies described herein, in whole or in part. For example, a set of one or more microcircuits of the processor 1702 may be configurable to execute one or more modules (e.g., software modules) described herein. In some example embodiments, the processor 1702 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1700 with at least the processor 1702, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1700 may further include a graphics display 1710 (e.g., a plasma display panel (PDP), a light emitting diode (LED) display, a liquid crystal display (LCD), a projector, a cathode ray tube (CRT), or any other display capable of displaying graphics or video). The machine 1700 may also include an alphanumeric input device 1712 (e.g., a keyboard or keypad), a pointer input device 1714 (e.g., a mouse, a touchpad, a touchscreen, a trackball, a joystick, a stylus, a motion sensor, an eye tracking device, a data glove, or other pointing instrument), a data storage 1716, an audio generation device 1718 (e.g., a sound card, an amplifier, a speaker, a headphone jack, or any suitable combination thereof), and a network interface device 1720.

The data storage 1716 (e.g., a data storage device) includes the machine-readable medium 1722 (e.g., a tangible and non-transitory machine-readable storage medium) on which are stored the instructions 1724 embodying any one or more of the methodologies or functions described herein. The instructions 1724 may also reside, completely or at least partially, within the main memory 1704, within the static memory 1706, within the processor 1702 (e.g., within the processor's cache memory), or any suitable combination thereof, before or during execution thereof by the machine 1700. Accordingly, the main memory 1704, the static memory 1506, and the processor 1702 may be considered machine-readable media (e.g., tangible and non-transitory machine-readable media). The instructions 1724 may be transmitted or received over the network 190 via the network interface device 1720. For example, the network interface device 1720 may communicate the instructions 1724 using any one or more transfer protocols (e.g., hypertext transfer protocol (HTTP)).

In some example embodiments, the machine 1700 may be a portable computing device (e.g., a smart phone, a tablet computer, or a wearable device), and may have one or more additional input components 1730 (e.g., sensors or gauges).

Examples of such input components 1730 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1724 for execution by the machine 1700, such that the instructions 1724, when executed by one or more processors of the machine 1700 (e.g., processor 1702), cause the machine 1700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1724 for execution by the machine 1700 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1724).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
receiving, by one or more processors of a machine, allocation requests submitted by requesters for an allocable region of a graphical user interface, the allocation requests specifying numerical values accorded to the allocable region by the requesters, each of the allocation requests corresponding to a server of a different requester among the requesters and specifying a numerical value accorded to the allocable region by the different requester;
determining, by one or more processors of the machine, a distribution of the numerical values accorded to the allocable region;
generating, by one or more processors of the machine, a set of configuration parameters that defines an allocation plan for the allocable region of the graphical user interface based on the distribution of the numerical values accorded to the allocable region;
cyclically updating, by one or more processors of the machine, the allocable region of the graphical user interface based on the allocation plan, the cyclic updating of the allocable region including selectively linking the allocable region to the server of each different requester among the requesters based on the set of configuration parameters that defines the allocation plan, the cyclic updating causing the allocable region to be linked to servers of different requesters at different times; and
causing, by one or more processors of the machine, one or more user devices to present the graphical user interface with the allocable region linked to servers of different requesters at different times in accordance with the allocation plan.

A second embodiment provides a method according to the first embodiment, wherein:
the set of configuration parameters that defines the allocation plan defines at least one of: first allocable shares of click-throughs apportioned to the requesters or second allocable shares of page views apportioned to the requesters, each of the first or second allocable shares corresponding to the allocable region and corresponding to a different requester among the requesters.

A third embodiment provides a method according to the first embodiment of the second embodiment, further comprising:
generating a set of threshold ranges based on the set of configuration parameters that define the allocation plan, the set including a first threshold range that corresponds to a first requester among the requesters and a second threshold range that corresponds to a second requester among the requesters; and wherein
the cyclic updating of the allocable region of the graphical user interface includes:
generating a random number while the allocable region is linked to a first server of the first requester;

comparing the random number to at least the second threshold range that corresponds to the second requester; and
linking the allocable region to a second server of the second requester instead of the first server of the first requester based on the random number falling within the second threshold range that corresponds to the second requester.

A fourth embodiment provides a method according to any of the first through third embodiments, wherein:
the generating of the set of configuration parameters includes:
calculating exponential powers of the numerical values accorded to the allocable region of the graphical user interface; and
determining allocable shares of clickthroughs apportioned to the requesters based on the exponential powers of the numerical values accorded to the allocable region, the allocable shares of clickthroughs corresponding to the allocable region.

A fifth embodiment provides a method according to the fourth embodiment, wherein:
the calculating of the exponential powers of the numerical values includes calculating fourth powers of the numerical values; and
the determining of the allocable shares of clickthroughs is based on the fourth powers of the numerical values.

A sixth embodiment provides a method according to the fourth embodiment or the fifth embodiment, wherein:
the determined allocable shares of clickthroughs apportioned to the requesters are proportional to the exponential powers of the numerical values.

A seventh embodiment provides a method according to any of the first through sixth embodiments, wherein:
the determining of the distribution of the numerical values includes determining that a largest numerical value among the numerical values exceeds a mean of the numerical values by a threshold value, the largest numerical value being accorded to the allocable region by a first requester among the requesters; and
in response to the largest numerical value exceeding the mean by the threshold value, the generating of the set of configuration parameters includes increasing a share of clickthroughs that corresponds to the allocable region and that is apportioned to a first server of the first requester.

An eighth embodiment provides a method according to the seventh embodiment, wherein:
the determining of the distribution of the numerical values includes calculating the threshold value based on a standard deviation of the numerical values.

A ninth embodiment provides a method according to any of the first through sixth embodiments, wherein:
the determining of the distribution of the numerical values includes determining that a largest numerical value among the numerical values fails to exceed a threshold value (e.g., exceed a mean of the numerical values by a threshold value), the largest numerical value being accorded to the allocable region by a first requester among the requesters; and
in response to the largest numerical value failing to exceed the threshold value (e.g., exceed the mean by the threshold value), the generating of the set of configuration parameters includes decreasing a share of clickthroughs that corresponds to the allocable region and that is apportioned to a first server of the first requester.

A variant of the ninth embodiment provides a method according to the ninth embodiment, wherein:
the determining of the distribution of the numerical values includes calculating the threshold value based on a standard deviation of the numerical values.

A tenth embodiment provides a method according to any one of the first through ninth embodiments, wherein:
the graphical user interface includes a list of requesters;
the allocable region is a first allocable region that occupies a first position in the list of requesters;
a second allocable region occupies a second position in the list of requesters;
the allocation plan is a first allocation plan for the first position in the list, the set of configuration parameters that defines the first allocation plan being a first set of configuration parameters;
the determining of the distribution of the numerical values accorded to the first position in the list includes determining a largest numerical value among the numerical values, the largest numerical value being accorded to the first position by a first requester among the requesters; and the method further comprises:
generating a second set of configuration parameters that defines a second allocation plan for the second position in the list of requesters, the generating of the second set including apportioning a largest allocable share of clickthroughs from the second position among multiple allocable shares of clickthroughs from the second position, the largest allocable share being apportioned to the first requester based on the largest numerical value being accorded to the first position by the first requester.

The eleventh embodiment provides a method according to the tenth embodiment, wherein:
the largest numerical value is a first largest numerical value, and the numerical values include a second largest numerical value smaller than the first largest numerical value but larger than all other numerical values, the second largest numerical value being accorded to the first position by a second requester among the requesters; and the method comprises:
generating a third set of configuration parameters that defines a third allocation plan for a third position in the list of requesters, the generating of the third set including apportioning a maximum allocable share of clickthroughs from the third position among multiple allocable shares of clickthroughs from the third position, the maximum allocable share being apportioned to the second requester based on the second largest numerical value being accorded to the first position by the second requester.

A twelfth embodiment provides a method according to any of the first through eleventh embodiments, further comprising:
receiving further allocation requests submitted by the requesters for the allocable region of the graphical user interface, the further allocation requests specifying costs of a same purchasable product;
determining that the costs specified in the further allocation requests are nonuniform and include a lowest cost that corresponds to a first requester among the requesters;
suspending the cyclic updating of the allocable region of the graphical user interface in response to the determining that the costs are nonuniform; and
while the cyclic updating is suspended, linking the allocable region to a server of the first requester in response to the lowest cost corresponding to the first requester.

A thirteenth embodiment provides a method according to the twelfth embodiment, further comprising:
resuming the cyclic updating of the allocable region of the graphical user interface in response to a determination that costs of the same purchasable product are uniform across the requesters.

A fourteenth embodiment provides a method according to any of the first through thirteenth embodiments, further comprising:

receiving a further allocation request for the allocable region of the graphical user interface, the further allocation request being submitted by a seller of a purchasable product;

suspending the cyclic updating of the allocable region in response to the further allocation request being submitted by the seller of the purchasable product; and while the cyclic updating is suspended, linking the allocable region to a server of the seller of the purchasable product.

A fifteenth embodiment provides a machine-readable medium (e.g., a non-transitory machine-readable storage medium) comprising instructions that, when executed by one or more processors of a machine, cause the machine (e.g., the one or more processors) to perform operations comprising:

receiving allocation requests submitted by requesters for an allocable region of a graphical user interface, the allocation requests specifying numerical values accorded to the allocable region by the requesters, each of the allocation requests corresponding to a server of a different requester among the requesters and specifying a numerical value accorded to the allocable region by the different requester;

determining a distribution of the numerical values accorded to the allocable region;

generating a set of configuration parameters that defines an allocation plan for the allocable region of the graphical user interface based on the distribution of the numerical values accorded to the allocable region;

cyclically updating the allocable region of the graphical user interface based on the allocation plan, the cyclic updating of the allocable region including selectively linking the allocable region to the server of each different requester among the requesters based on the set of configuration parameters that defines the allocation plan, the cyclic updating causing the allocable region to be linked to servers of different requesters at different times; and causing one or more user devices to present the graphical user interface with the allocable region linked to servers of different requesters at different times in accordance with the allocation plan.

A sixteenth embodiment provides a machine-readable medium according to the fifteenth embodiment, wherein: the set of configuration parameters that defines the allocation plan includes at least one of first allocable shares of clickthroughs apportioned to the requesters or second allocable shares of page views apportioned to the requesters, each of the first or second quantities corresponding to the allocable region and corresponding to a different requester among the requesters.

A seventeenth embodiment provides a machine-readable medium according to the fifteenth or sixteenth embodiments, wherein the operations further comprise:

generating a set of threshold ranges based on the set of configuration parameters that define the allocation plan, the set including a first threshold range that corresponds to a first requester among the requesters and a second threshold range that corresponds to a second requester among the requesters; and wherein the cyclic updating of the allocable region of the graphical user interface includes:

generating a random number while the allocable region is linked to a first server of the first requester;

comparing the random number to at least the second threshold range that corresponds to the second requester; and linking the allocable region to a second server of the second requester instead of the first server of the first requester based on the random number falling within the second threshold range that corresponds to the second requester.

An eighteenth embodiment provides a system comprising:

one or more processors; and one or more memories storing instructions that, when executed by at least one processor among the one or more processors, causes the system to perform operations comprising:

receiving allocation requests submitted by requesters for an allocable region of a graphical user interface, the allocation requests specifying numerical values accorded to the allocable region by the requesters, each of the allocation requests corresponding to a server of a different requester among the requesters and specifying a numerical value accorded to the allocable region by the different requester;

determining a distribution of the numerical values accorded to the allocable region;

generating a set of configuration parameters that defines an allocation plan for the allocable region of the graphical user interface based on the distribution of the numerical values accorded to the allocable region;

cyclically updating the allocable region of the graphical user interface based on the allocation plan, the cyclic updating of the allocable region including selectively linking the allocable region to the server of each different requester among the requesters based on the set of configuration parameters that defines the allocation plan, the cyclic updating causing the allocable region to be linked to servers of different requesters at different times; and causing one or more user devices to present the graphical user interface with the allocable region linked to servers of different requesters at different times in accordance with the allocation plan.

A nineteenth embodiment provides a system according to the eighteenth embodiment, wherein:

the generating of the set of configuration parameters includes:

calculating exponential powers of the numerical values accorded to the allocable region of the graphical user interface; and determining allocable shares of clickthroughs apportioned to the requesters based on the exponential powers of the numerical values accorded to the allocable region, the allocable shares of clickthroughs corresponding to the allocable region.

A twentieth embodiment provides a system according to the eighteenth embodiment or the nineteenth embodiment, wherein:

the determining of the distribution of the numerical values includes determining that a largest numerical value among the numerical values exceeds a mean of the numerical values by a threshold value, the largest numerical value being accorded to the allocable region by a first requester among the requesters; and in response to the largest numerical value exceeding the mean by the threshold value, the generating of the set of configuration parameters includes increasing a share of clickthroughs that corresponds to the allocable region and that is apportioned to a first server of the first requester.

A twenty-first embodiment provides a method comprising:

receiving, by one or more processors of a machine, share requests submitted by requesters for a shareable item, the share requests specifying numerical values accorded to the shareable item by the requesters, each of the share requests corresponding to a computer of a different requester among the requesters and specifying a numerical value accorded to the shareable item by the different requester;

determining, by one or more processors of the machine, a distribution of the numerical values accorded to the shareable item;

generating, by one or more processors of the machine, a set of configuration parameters that defines an allocation plan for the shareable item based on the distribution of the numerical values, the numerical values including a first numerical value accorded to the shareable item by a first requester among the requesters;

determining, by one or more processors of the machine, an allocated percentage at which the shareable item is allocated to the first requester in accordance with the set of configuration parameters that defines the allocation plan;

selecting, by one or more processors of the machine, an alternative percentage at which the shareable item is allocable to the first requester, the alternative percentage being selected from an available set of alternative percentages;

calculating, by one or more processors of the machine, an alternative numerical value accordable to the shareable item by the first requester; and causing, by one or more processors of the machine, a first computer of the first requester to present a notification that the shareable item is allocable to the first requester at the alternative percentage conditioned upon reception of a future share request to indicate that the first requester accords the alternative numerical value to the shareable item.

A twenty-second embodiment provides a method according to the twenty-first embodiment, wherein:

the share requests for the shareable item are allocation requests that an allocable region of a graphical user interface be allocated among the requesters according to the allocation plan.

A twenty-third embodiment provides a method according to the twenty-second embodiment, wherein:

the set of configuration parameters that defines the allocation plan defines at least one of: first allocable shares of click-throughs apportioned to the requesters or second allocable shares of page views apportioned to the requesters, each of the first or second allocable shares corresponding to the allocable region and corresponding to a different requester among the requesters.

A twenty-fourth embodiment provides a method according to any of the twenty-first through twenty-third embodiments, wherein:

the calculating of the alternative numerical value accordable to the shareable item includes generating an alternative set of configuration parameters that defines an alternative allocation plan by which the shareable item is allocable to the first requester at the alternative percentage instead of the allocated percentage, the generating of the alternative set of configuration parameters being based on the selected alternative percentage.

A twenty-fifth embodiment provides a method according to any of the twenty-first to twenty-fourth embodiments, wherein:

the selecting of the alternative percentage for the first requester is based on the alternative percentage being higher than the allocated percentage for the first requester; and the calculating of the alternative numerical value includes generating an alternative set of configuration parameters that defines an alternative allocation plan by which the shareable item is allocable to the first requester at the alternative percentage that is higher than the allocated percentage, the generating of the alternative set of configuration parameters being based on the selected alternative percentage that is higher than the allocated percentage.

A twenty-sixth embodiment provides a method according to any of the twenty-first through twenty-fifth embodiment, wherein:

the selecting of the alternative percentage for the first requester is based on the alternative percentage being lower than the allocated percentage for the first requester; and the calculating of the alternative numerical value includes generating an alternative set of configuration parameters that defines an alternative allocation plan by which the shareable item is allocable to the first requester at the alternative percentage that is lower than the allocated percentage, the generating of the alternative set of configuration parameters being based on the selected alternative percentage that is lower than the allocated percentage.

A twenty-seventh embodiment provides a method according to any of the twenty-first through twenty-sixth embodiments, wherein:

the selecting of the alternative percentage for the first requester includes selecting an integer multiple of five percent; and the calculating of the alternative numerical value includes generating an alternative set of configuration parameters that defines an alternative allocation plan by which the shareable item is allocable to the first requester at the alternative percentage instead of the allocated percentage, the generating of the alternative set of configuration parameters being based on the selected integer multiple of five percent.

A twenty-eighth embodiment provides a method according to any of the twenty-first through twenty-seventh embodiments, wherein:

each alternative percentage in the available set of alternative percentages is in a range between five percent and eighty percent; and the selecting of the alternative percentage includes selecting the alternative percentage from the range between five percent and eighty percent.

A twenty-ninth embodiment provides a method according to the twenty-eighth embodiment, wherein:

the calculating of the alternative numerical value includes generating an alternative set of configuration parameters that defines an alternative allocation plan by which the shareable item is allocable to the first requester at the alternative percentage instead of the allocated percentage; the generating of the alternative set of configuration parameters being based on the selected alternative percentage in the range between five percent and eighty percent.

A thirtieth embodiment provides a method according to any of the twenty-first through twenty-ninth embodiments, wherein:

the causing of the first computer of the first requester to present the notification includes:

generating the notification to indicate that the shareable item is allocable to the first requester at the alternative percentage conditioned upon reception of the future share request in which the first requester accords the alternative value to the shareable item; and communicating the notification to the first computer.

A thirty-first embodiment provides a method according to any of the twenty-first through thirtieth embodiments, wherein:

the causing of the first computer of the first requester to present the notification includes:

generating the notification to include the first numerical value accorded to the shareable item by the first requester and to include a suggestion that the alternative numerical value replace the first numerical value in the future share request by the first requester; and communicating the notification to the first computer.

A thirty-second embodiment provides a method according to any of the twenty-first through thirty-first embodiments, wherein:

the causing of the first computer of the first requester to present the notification includes:

generating the notification to include the alternative numerical value accordable to the shareable item by the first requester and to include a suggestion that the alternative numerical value replace the first numerical value in the future share request by the first requester; and communicating the notification to the first computer.

A thirty-third embodiment provides a method according to any of the twenty-first through thirty-second embodiments, wherein:

the causing of the first computer of the first requester to present the notification includes:

generating the notification to include the alternative percentage at which the shareable item is allocable to the first requester and to a suggestion that the alternative numerical value replace the first numerical value in the future share request by the first requester; and communicating the notification to the first computer.

A thirty-fourth embodiment provides a method according to any of the twenty-first through thirty-third embodiments, wherein:

the causing of the first computer of the first requester to present the notification includes:

generating the notification to include the allocated percentage at which the shareable item is allocated to the first requester and to include a suggestion that the alternative numerical value replace the first numerical value in the future share request by the first requester; and communicating the notification to the first computer.

A thirty-fifth embodiment provides a method according to any of the twenty-first through thirty-fourth embodiments, wherein:

the calculated alternative numerical value accordable to the shareable item by the first requester is inconsistent with the determined distribution of the numerical values accorded to the shareable item.

A thirty-sixth embodiment provides a machine-readable medium (e.g., a non-transitory machine-readable storage medium) comprising instructions that, when executed by one or more processors of a machine, cause the machine (e.g., the one or more processors) to perform operations comprising:

receiving share requests submitted by requesters for a shareable item, the share requests specifying numerical values accorded to the shareable item by the requesters, each of the share requests corresponding to a computer of a different requester among the requesters and specifying a numerical value accorded to the shareable item by the different requester;

determining a distribution of the numerical values accorded to the shareable item;

generating a set of configuration parameters that defines an allocation plan for the shareable item based on the distribution of the numerical values, the numerical values including a first numerical value accorded to the shareable item by a first requester among the requesters;

determining an allocated percentage at which the shareable item is allocated to the first requester in accordance with the set of configuration parameters that defines the allocation plan;

selecting an alternative percentage at which the shareable item is allocable to the first requester, the alternative percentage being selected from an available set of alternative percentages;

calculating an alternative numerical value accordable to the shareable item by the first requester; and causing a first computer of the first requester to present a notification that the shareable item is allocable to the first requester at the alternative percentage conditioned upon reception of a future share request to indicate that the first requester accords the alternative numerical value to the shareable item.

A thirty-seventh embodiment provides a machine-readable medium according to the thirty-sixth embodiment, wherein:

the selecting of the alternative percentage for the first requester is based on the alternative percentage being higher than the allocated percentage for the first requester; and the calculating of the alternative numerical value includes generating an alternative set of configuration parameters that defines an alternative allocation plan by which the shareable item is allocable to the first requester at the alternative percentage that is higher than the allocated percentage, the generating of the alternative set of configuration parameters being based on the selected alternative percentage that is higher than the allocated percentage.

A thirty-eighth embodiment provides a system comprising:

one or more processors; and one or more memories storing instructions that, when executed by at least one processor among the one or more processors, causes the system to perform operations comprising:

receiving share requests submitted by requesters for a shareable item, the share requests specifying numerical values accorded to the shareable item by the requesters, each of the share requests corresponding to a computer of a different requester among the requesters and specifying a numerical value accorded to the shareable item by the different requester;

determining a distribution of the numerical values accorded to the shareable item;

generating a set of configuration parameters that defines an allocation plan for the shareable item based on the distribution of the numerical values, the numerical values including a first numerical value accorded to the shareable item by a first requester among the requesters;

determining an allocated percentage at which the shareable item is allocated to the first requester in accordance with the set of configuration parameters that defines the allocation plan;

selecting an alternative percentage at which the shareable item is allocable to the first requester, the alternative percentage being selected from an available set of alternative percentages;

calculating an alternative numerical value accordable to the shareable item by the first requester; and causing a first computer of the first requester to present a notification that the shareable item is allocable to the first requester at the alternative percentage conditioned upon reception of a future share request to indicate that the first requester accords the alternative numerical value to the shareable item.

A thirty-ninth embodiment provides a system according to the thirty-eighth embodiment, wherein:
the share requests for the shareable item are allocation requests that an allocable region of a graphical user interface be allocated among the requesters according to the allocation plan.

A fortieth embodiment provides a system according to the thirty-eighth embodiment or the thirty-ninth embodiment, wherein:
the calculating of the alternative numerical value accordable to the shareable item includes generating an alternative set of configuration parameters that defines an alternative allocation plan by which the shareable item is allocable to the first requester at the alternative percentage instead of the allocated percentage, the generating of the alternative set of configuration parameters being based on the selected alternative percentage.

A forty-first embodiment provides a carrier medium carrying machine-readable instructions for controlling a machine to carry out the method of any one of the first through fourteenth embodiments.

A forty-second embodiment provides a carrier medium carrying machine-readable instructions for controlling a machine to carry out the method of any one of the twenty-first through thirty-fifth embodiments.

What is claimed is:

1. A method comprising:
receiving, by one or more processors of a machine, share requests submitted by requesters for a shareable item, the share requests specifying numerical values accorded to the shareable item by the requesters, each of the share requests corresponding to a computer of a different requester among the requesters and specifying a numerical value accorded to the shareable item by the different requester;
determining, by one or more processors of the machine, a distribution of the numerical values accorded to the shareable item by the requesters;
generating, by one or more processors of the machine, a set of configuration parameters that defines an allocation plan for the shareable item based on the distribution of the numerical values, the numerical values including a first numerical value accorded to the shareable item by a first requester among the requesters;
determining, by one or more processors of the machine, an allocated percentage at which the shareable item is allocated to the first requester in accordance with the set of configuration parameters that defines the allocation plan;
selecting, by one or more processors of the machine, an alternative percentage at which the shareable item is allocable to the first requester, the alternative percentage being selected from an available set of alternative percentages;
calculating, by one or more processors of the machine, an alternative numerical value accordable to the shareable item by the first requester; and
causing, by one or more processors of the machine, a first computer of the first requester to present a notification that the shareable item is allocable to the first requester at the alternative percentage conditioned upon reception of a future share request to indicate that the first requester accords the alternative numerical value to the shareable item.

2. The method of claim 1, wherein:
the share requests for the shareable item are allocation requests that an allocable region of a graphical user interface be allocated among the requesters according to the allocation plan.

3. The method of claim 2, wherein:
the set of configuration parameters that defines the allocation plan defines at least one of: first allocable shares of clickthroughs apportioned to the requesters or second allocable shares of page views apportioned to the requesters, each of the first or second allocable shares corresponding to the allocable region and corresponding to a different requester among the requesters.

4. The method of claim 1, wherein:
the calculating of the alternative numerical value accordable to the shareable item includes generating an alternative set of configuration parameters that defines an alternative allocation plan by which the shareable item is allocable to the first requester at the alternative percentage instead of the allocated percentage, the generating of the alternative set of configuration parameters being based on the selected alternative percentage.

5. The method of claim 1, wherein:
the selecting of the alternative percentage for the first requester is based on the alternative percentage being higher than the allocated percentage for the first requester; and
the calculating of the alternative numerical value includes generating an alternative set of configuration parameters that defines an alternative allocation plan by which the shareable item is allocable to the first requester at the alternative percentage that is higher than the allocated percentage, the generating of the alternative set of configuration parameters being based on the selected alternative percentage that is higher than the allocated percentage.

6. The method of claim 1, wherein:
the selecting of the alternative percentage for the first requester is based on the alternative percentage being lower than the allocated percentage for the first requester; and
the calculating of the alternative numerical value includes generating an alternative set of configuration parameters that defines an alternative allocation plan by which the shareable item is allocable to the first requester at the alternative percentage that is lower than the allocated percentage, the generating of the alternative set of configuration parameters being based on the selected alternative percentage that is lower than the allocated percentage.

7. The method of claim 1, wherein:
the selecting of the alternative percentage for the first requester includes selecting an integer multiple of five percent; and
the calculating of the alternative numerical value includes generating an alternative set of configuration parameters that defines an alternative allocation plan by which the shareable item is allocable to the first requester at the alternative percentage instead of the allocated percentage, the generating of the alternative set of configuration parameters being based on the selected integer multiple of five percent.

8. The method of claim 1, wherein:
each alternative percentage in the available set of alternative percentages is in a range between five percent and eighty percent; and the selecting of the alternative percentage includes selecting the alternative percentage from the range between five percent and eighty percent.

9. The method of claim 8, wherein:
the calculating of the alternative numerical value includes generating an alternative set of configuration parameters that defines an alternative allocation plan by which the shareable item is allocable to the first requester at the alternative percentage instead of the allocated percentage; the generating of the alternative set of configuration parameters being based on the selected alternative percentage in the range between five percent and eighty percent.

10. The method of claim 1, wherein:
the causing of the first computer of the first requester to present the notification includes:
generating the notification to indicate that the shareable item is allocable to the first requester at the alternative percentage conditioned upon reception of the future share request in which the first requester accords the alternative value to the shareable item; and
communicating the notification to the first computer.

11. The method of claim 1, wherein:
the causing of the first computer of the first requester to present the notification includes:
generating the notification to include the first numerical value accorded to the shareable item by the first requester and to include a suggestion that the alternative numerical value replace the first numerical value in the future share request by the first requester; and
communicating the notification to the first computer.

12. The method of claim 1, wherein:
the causing of the first computer of the first requester to present the notification includes:
generating the notification to include the alternative numerical value accordable to the shareable item by the first requester and to include a suggestion that the alternative numerical value replace the first numerical value in the future share request by the first requester; and
communicating the notification to the first computer.

13. The method of claim 1, wherein:
the causing of the first computer of the first requester to present the notification includes:
generating the notification to include the alternative percentage at which the shareable item is allocable to the first requester and to a suggestion that the alternative numerical value replace the first numerical value in the future share request by the first requester; and
communicating the notification to the first computer.

14. The method of claim 1, wherein:
the causing of the first computer of the first requester to present the notification includes:
generating the notification to include the allocated percentage at which the shareable item is allocated to the first requester and to include a suggestion that the alternative numerical value replace the first numerical value in the future share request by the first requester; and
communicating the notification to the first computer.

15. The method of claim 1, wherein:
the calculated alternative numerical value accordable to the shareable item by the first requester is inconsistent with the determined distribution of the numerical values accorded to the shareable item.

16. A non-transitory machine-readable storage medium comprising instructions that, when executed by one or more processors of a machine, cause the machine to perform operations comprising:
receiving share requests submitted by requesters for a shareable item, the share requests specifying numerical values accorded to the shareable item by the requesters, each of the share requests corresponding to a computer of a different requester among the requesters and specifying a numerical value accorded to the shareable item by the different requester;
determining a distribution of the numerical values accorded to the shareable item by the requesters;
generating a set of configuration parameters that defines an allocation plan for the shareable item based on the distribution of the numerical values, the numerical values including a first numerical value accorded to the shareable item by a first requester among the requesters;
determining an allocated percentage at which the shareable item is allocated to the first requester in accordance with the set of configuration parameters that defines the allocation plan;
selecting an alternative percentage at which the shareable item is allocable to the first requester, the alternative percentage being selected from an available set of alternative percentages;
calculating an alternative numerical value accordable to the shareable item by the first requester; and
causing a first computer of the first requester to present a notification that the shareable item is allocable to the first requester at the alternative percentage conditioned upon reception of a future share request to indicate that the first requester accords the alternative numerical value to the shareable item.

17. The non-transitory machine-readable storage medium of claim 16, wherein:
the selecting of the alternative percentage for the first requester is based on the alternative percentage being higher than the allocated percentage for the first requester; and
the calculating of the alternative numerical value includes generating an alternative set of configuration parameters that defines an alternative allocation plan by which the shareable item is allocable to the first requester at the alternative percentage that is higher than the allocated percentage, the generating of the alternative set of configuration parameters being based on the selected alternative percentage that is higher than the allocated percentage.

18. A system comprising:
processors; and
a memory storing instructions that, when executed by at least one processor among the processors, causes the system to perform operations comprising:
receiving share requests submitted by requesters for a shareable item, the share requests specifying numerical values accorded to the shareable item by the requesters, each of the share requests corresponding to a computer of a different requester among the requesters and specifying a numerical value accorded to the shareable item by the different requester;
determining a distribution of the numerical values accorded to the shareable item by the requesters;

generating a set of configuration parameters that defines an allocation plan for the shareable item based on the distribution of the numerical values, the numerical values including a first numerical value accorded to the shareable item by a first requester among the requesters;

determining an allocated percentage at which the shareable item is allocated to the first requester in accordance with the set of configuration parameters that defines the allocation plan;

selecting an alternative percentage at which the shareable item is allocable to the first requester, the alternative percentage being selected from an available set of alternative percentages;

calculating an alternative numerical value accordable to the shareable item by the first requester; and causing a first computer of the first requester to present a notification that the shareable item is allocable to the first requester at the alternative percentage conditioned upon reception of a future share request to indicate that the first requester accords the alternative numerical value to the shareable item.

19. The system of claim 18, wherein:

the share requests for the shareable item are allocation requests that an allocable region of a graphical user interface be allocated among the requesters according to the allocation plan.

20. The system of claim 18, wherein:

the calculating of the alternative numerical value accordable to the shareable item includes generating an alternative set of configuration parameters that defines an alternative allocation plan by which the shareable item is allocable to the first requester at the alternative percentage instead of the allocated percentage, the generating of the alternative set of configuration parameters being based on the selected alternative percentage.

\* \* \* \* \*